United States Patent
Hayashida

(10) Patent No.: US 8,949,967 B2
(45) Date of Patent: Feb. 3, 2015

(54) INFORMATION MANAGEMENT APPARATUS, INFORMATION MANAGEMENT METHOD, AND NON-TRANSITORY COMPUTER-READABLE STORAGE MEDIUM

(75) Inventor: Naoko Hayashida, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 13/362,707

(22) Filed: Jan. 31, 2012

(65) Prior Publication Data

US 2012/0131648 A1 May 24, 2012

Related U.S. Application Data

(63) Continuation of application No. PCT/JP2009/064469, filed on Aug. 18, 2009.

(51) Int. Cl.
G06F 12/14 (2006.01)
G06Q 10/10 (2012.01)

(52) U.S. Cl.
CPC ..................................... *G06Q 10/10* (2013.01)
USPC ................. 726/14; 726/24; 380/30; 380/232; 713/152; 713/153; 713/154; 713/170

(58) Field of Classification Search
CPC .............. H04L 63/104; H04L 12/1813; H04L 65/1066; H04L 65/403; H04L 67/24; H04L 67/1044; H04L 67/146; H04L 9/3263; H04N 21/4753; G06F 21/64; G06F 21/6245
USPC ......... 726/14, 24; 380/30, 232; 713/152, 153, 713/154, 170; 725/14, 24
See application file for complete search history.

(56) References Cited

U.S. PATENT DOCUMENTS 7,734,917 B2    6/2010  Chang et al.
7,849,140 B2 *  12/2010 Abdel-Aziz et al. .......... 709/206
8,255,683 B2 *  8/2012  Dickinson et al. ............ 713/153
(Continued)

FOREIGN PATENT DOCUMENTS

CN    1585324 A    2/2005
JP    08-008851    1/1996
(Continued)

OTHER PUBLICATIONS

Extended European Search Report dated Apr. 3, 2012 issued in corresponding European Patent Application No. 09848477.7.
(Continued)

*Primary Examiner* — Eleni Shiferaw
*Assistant Examiner* — Paul Callahan
(74) *Attorney, Agent, or Firm* — Staas & Halsey LLP

(57) ABSTRACT

An information management apparatus includes a first control information setting unit that sets first control information for permitting use of information within a destination terminal to the information; a second control information setting unit that sets second control information for permitting the destination terminal to forward the information to the information; a displaying permitting unit that controls, when information set with the first control information is received from a source terminal, to permit the information to be used locally within an apparatus; and a forwarding permitting unit that controls, when information set with the second control information is received from a source terminal, to permit the information to be forwarded.

6 Claims, 25 Drawing Sheets

(56) References Cited

U.S. PATENT DOCUMENTS

| | | |
|---|---|---|
| 2003/0233364 A1 | 12/2003 | Nakao et al. |
| 2007/0130198 A1 | 6/2007 | Kikuchi |
| 2007/0214353 A1 | 9/2007 | Dickinson, III et al. |
| 2009/0031393 A1* | 1/2009 | Denner et al. ............ 726/1 |
| 2009/0070360 A1* | 3/2009 | Lyle ...................... 707/102 |

FOREIGN PATENT DOCUMENTS

| | | |
|---|---|---|
| JP | 2000-099010 | 4/2000 |
| JP | 2004-013341 | 1/2004 |
| JP | 2006-040016 | 2/2006 |
| JP | 2007-156995 | 6/2007 |
| WO | 2007/083300 A2 | 7/2007 |

OTHER PUBLICATIONS

International Search Report of PCT/JP2009/064469 mailed Dec. 10, 2009.
Partial Translation of Written Opinion from PCT/JP2009/064469.
Chinese Office Action mailed Jan. 6, 2014 in corresponding Chinese Application No. 200980160958.4.

* cited by examiner

INFORMATION MANAGEMENT APPARATUS, INFORMATION MANAGEMENT METHOD, AND NON-TRANSITORY COMPUTER-READABLE STORAGE MEDIUM

CROSS-REFERENCE TO RELATED APPLICATION

This application is a continuation of International Application No. PCT/JP2009/064469, filed on Aug. 18, 2009, the entire contents of which are incorporated herein by reference.

FIELD

The present invention relates to an information management apparatus, an information management method, and an information management program.

BACKGROUND

Conventionally, members who are in a common business or those having a common hobby organize a group, and information is provided to the members of the group to activate communications among the members and to increase convenience for the members. In such a group, to provide information, an owner owning his/her information transmits the information from his/her terminal to other members' terminals, for example.

As a group in which information is shared, a temporary group may be organized to share information only for a certain time period. To organize such a temporary group, a method in which someone's own information is transmitted to someone else's terminal via an intermediating terminal is known. For example, as illustrated in FIG. 27, a terminal C of a user C transmits a request requesting a referral to a certain person to a terminal A of a user A who is a friend of the user C. The terminal A belonging to the user A and receiving the request transmits a referral permission having terminal data of the terminal C appended thereto to a user B. A terminal B belonging to the user B and receiving the referral permission obtains the terminal data of the terminal C, and communicates with the user C.

Patent Literature 1: Japanese Patent Application Laid-open No. 2006-40016

SUMMARY

According to an aspect of an embodiment of the invention, an information management apparatus includes a first control information setting unit that sets first control information for permitting use of information within a destination terminal to the information; a second control information setting unit that sets second control information for permitting the destination terminal to forward the information to the information; a displaying permitting unit that controls, when information set with the first control information is received from a source terminal, to permit the information to be used locally within an apparatus; and a forwarding permitting unit that controls, when information set with the second control information is received from a source terminal, to permit the information to be forwarded.

The object and advantages of the embodiment will be realized and attained by means of the elements and combinations particularly pointed out in the claims.

It is to be understood that both the foregoing general description and the following detailed description are exemplary and explanatory and are not restrictive of the embodiment, as claimed.

DESCRIPTION OF EMBODIMENTS

Embodiments of an information management apparatus, an information management method, and an information management program according to the present invention will now be explained in detail with reference to the appended drawings.

First Embodiment

Figure 1:
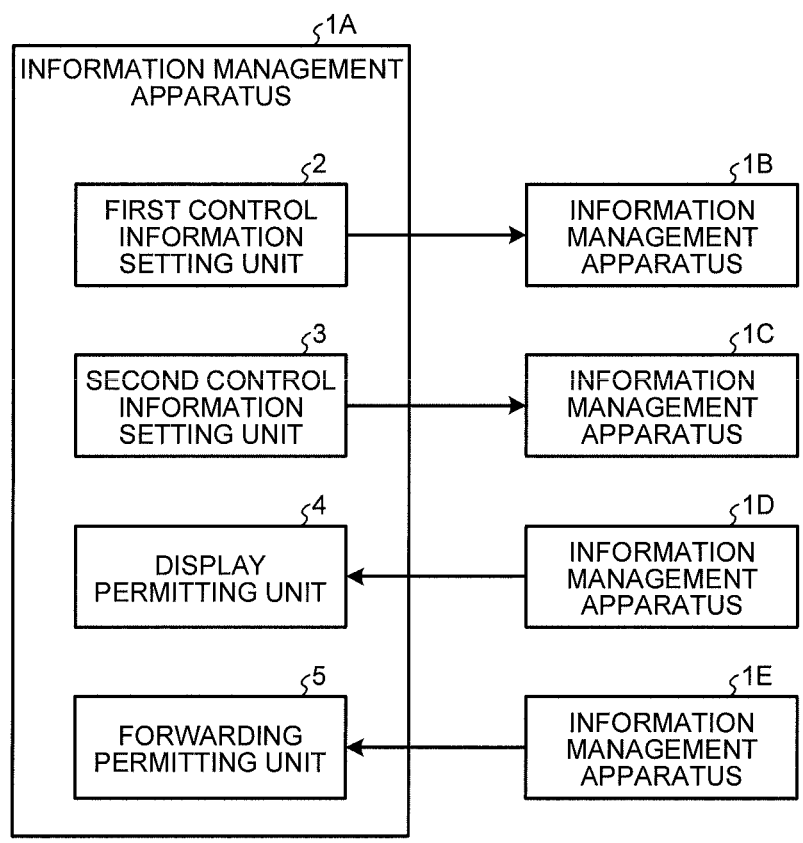
FIG. 1 is a block diagram illustrating a configuration of an information management apparatus according to a first embodiment of the present invention.

In an embodiment explained below, a configuration of and a process performed by an information management apparatus according to a first embodiment of the present invention will be explained. The configuration of an information management apparatus 1 according to the first embodiment will now be explained with reference to FIG. 1. FIG. 1 is a block diagram illustrating a configuration of the information management apparatus according to the first embodiment.

An information management apparatus 1A according to the first embodiment includes a first control information setting unit 2, a second control information setting unit 3, a forwarding permitting unit 4, and a display permitting unit 5, and is connected to other information management apparatuses 1B, 1C, 1D, and 1E over a network.

The first control information setting unit 2 sets first control information for permitting information to be used on the information management apparatus 1B to the information. The second control information setting unit 3 sets second control information for permitting the information management apparatus 10 to forward information to the information.

When the display permitting unit 4 receives the information set with the first control information from the information management apparatus 1D, the display permitting unit 4 controls to permit local use of the information to display the information only on that apparatus. When the forwarding permitting unit 5 receives the information set with the second control information from the information management apparatus 1E, the forwarding permitting unit 5 controls to permit such information to be forwarded.

In other words, as for use of the information by the information management apparatus 1B, the information management apparatus 1 permits use of the information only on the information management apparatus 1B. As for use of the information by the information management apparatus 10, the information management apparatus 1 permits the destination information management apparatus 10 to forward the information. Therefore, the information owner can have a control over restrictions on use of the information.

Furthermore, the information management apparatus 1 can make local use of the information set with the first control information only on that apparatus, but may not be able to forward the information to another terminal. At the same time, the information management apparatus 1 can forward the information set with the second control information to another terminal. Therefore, the information may not be able to be used against the intention of the information owner.

In this manner, for a destination terminal that is not permitted to forward the information, the information management apparatus 1 sets the first control information for permitting the information to be used on such a terminal to the information. For a destination terminal permitted to forward the information, the information management apparatus 1 sets the second control information for permitting the information to be forwarded to the information. Furthermore, when information set with the first control information is received from a source terminal, the information management apparatus 1 controls to permit local use of the information to display the information on the apparatus. When information set with the second control information is received from a source terminal, the information management apparatus 1 controls to permit the information to be forwarded. As a result, the information owner can apply restrictions on how the information will be used after providing the information.

Second Embodiment

In an embodiment explained below, a configuration of an information management apparatus according to a second embodiment of the present invention and then a process performed thereby will be explained, and the advantageous effects achieved by the second embodiment will be finally explained. In the example used in the explanation below, key information including a set of a public key and a private key is used as control information. In addition, in the example explained hereunder, the information management apparatus is applied to sharing of information in a temporary group that is organized for the purpose of providing information.

Configuration of Information Management Apparatus

Figure 2:
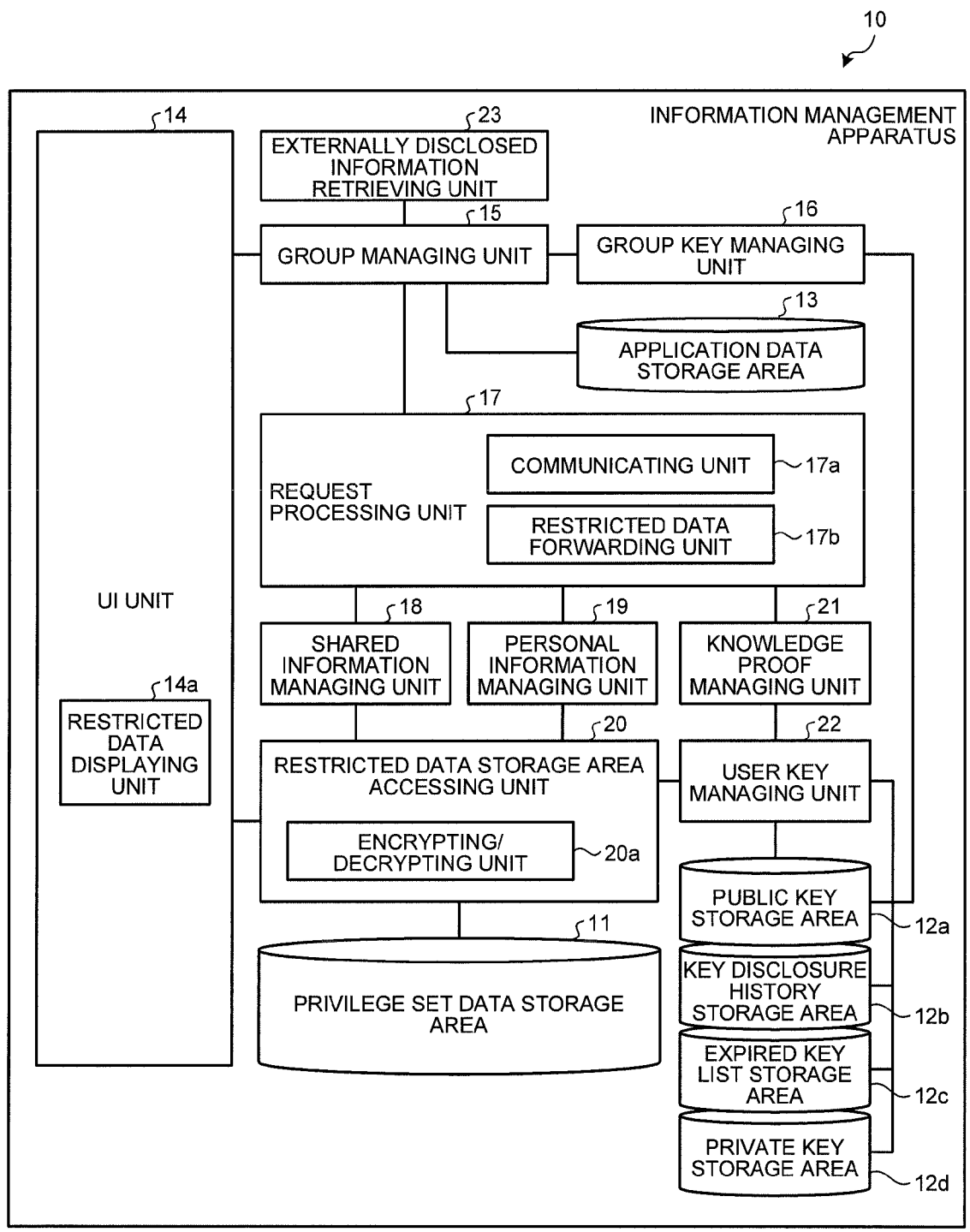
FIG. 2 is a block diagram illustrating a configuration of an information management apparatus according to a second embodiment of the present invention.

To begin with, a configuration of an information management apparatus 10 will be explained with reference to FIG. 2. FIG. 2 is a block diagram illustrating a configuration of the information management apparatus 10 according to the second embodiment. As illustrated in FIG. 2, the information management apparatus 10 includes a privilege set data storage area 11, a public key storage area 12a, a key disclosure history storage area 12b, an expired key list storage area 12c, a private key storage area 12d, an application data storage area 13, a user interface (UI) unit 14, a restricted data displaying unit 14a, a group managing unit 15, and a group key managing unit 16.

The information management apparatus 10 also includes a request processing unit 17, a communicating unit 17a, a restricted data forwarding unit 17b, a shared information managing unit 18, a personal information managing unit 19, and a restricted data storage area accessing unit 20. The information management apparatus 10 also includes an encrypting/decrypting unit 20a, a knowledge proof managing unit 21, a user key managing unit 22, and an externally disclosed information retrieving unit 23, and is connected to other information management apparatuses over a network, for example. A process performed by each of these units will now be explained.

The privilege set data storage area 11 stores therein private information that is information about the user of the management apparatus him/herself, group disclosed information disclosed in the temporary group, information granted with permission for primary use only, and information granted with permission for secondary use. The information granted with permission for primary use herein means information that is only permitted to be used within the apparatus. The information granted with permission for secondary use herein means information that is permitted to be forwarded to another terminal. These types of information may be granted with permission for use without any expiration, or may be stored with an expiration for use.

The public key storage area 12a stores therein a public key. The key disclosure history storage area 12b stores therein a history of key disclosures. The expired key list storage area 12c stores therein a list of expired keys. The private key storage area 12d stores therein a private key. The application data storage area 13 stores therein application data for managing the members of a temporary group, and presence of secondary permission for the information belonging to each of the members.

The UI unit 14 receives an instruction issued by a user using a mouse or a keyboard. For example, the UI unit 14 receives an instruction as to whether joining the temporary group is approved. The UI unit 14 also includes the restricted data displaying unit 14a.

When information appended with first control information (a primary use key) is received from another information management apparatus that is a source terminal, the restricted data displaying unit 14a controls, to permit the information thus received to be displayed locally on the apparatus. Before forwarding information set with the second control information (a secondary use key) from a source terminal to another terminal, the restricted data displaying unit 14a converts the information set with a secondary use terminal to information set with a primary use terminal, and forwards the information to the other terminal (this process will be explained later more specifically with reference to FIG. 11).

The group managing unit 15 manages the members of the temporary group, and presence of permissions for secondary use of information owned by each of these members. The group key managing unit 16 manages public keys and private keys received from other information management apparatuses. More specifically, the group key managing unit 16 stores received public keys in the public key storage area 12a, and stores received private keys in the private key storage area 12d. The group key managing unit 16 also stores, when a public key or a private key expires, the expired public key or private key in the expired key list storage area.

The request processing unit 17 includes the communicating unit 17a and the restricted data forwarding unit 17b, and transmits a request to and receives a request from, and transmits a response to a request and receives a response to a request from another information management apparatus to be connected with. The communicating unit 17a transmits information to and receives information from other information management apparatuses. The communicating unit 17a also transmits a request for joining a group. The restricted data forwarding unit 17b controls to permit forwarding of received information when information set with forwarding permission is received from a source terminal.

The shared information managing unit 18 manages the information shared in the group. More specifically, when a user designates information to be shared in the group, the shared information managing unit 18 specifies that the information thus designated is the information to be shared in the group, and transmits the information thus specified to the information management apparatus of the organizer of the group via the communicating unit 17a. The personal information managing unit 19 manages personal information of each member. A trust level may be added to the personal information, and such a trust level is used to allow the apparatus to automatically determine if the primary use is permitted to a particular member, and/or the secondary use is permitted to such a member.

The restricted data storage area accessing unit 20 sets a primary use key that permits information use on a destination terminal to the information. The restricted data storage area accessing unit 20 also sets the secondary use key that permits information forwarding at a destination terminal to the information. The encrypting/decrypting unit 20a encrypts information and decrypts information using a public key or a private key.

The knowledge proof managing unit 21 manages a proof of knowledge. For example, when a user (an information owner) is to join a group directly, the knowledge proof managing unit 21 checks personal information to confirm if a requestor of the information is an acquaintance of the information owner.

The user key managing unit 22 manages the key information. More specifically, the user key managing unit 22 reads a public key or a private key that is used in encrypting or decrypting information from the public key storage area 12a or the private key storage area 12d, and gives a notification to the restricted data storage area accessing unit 20. The externally disclosed information retrieving unit 23 retrieves for an information owner or an information holder who is disclosing information externally.

Figure 3:
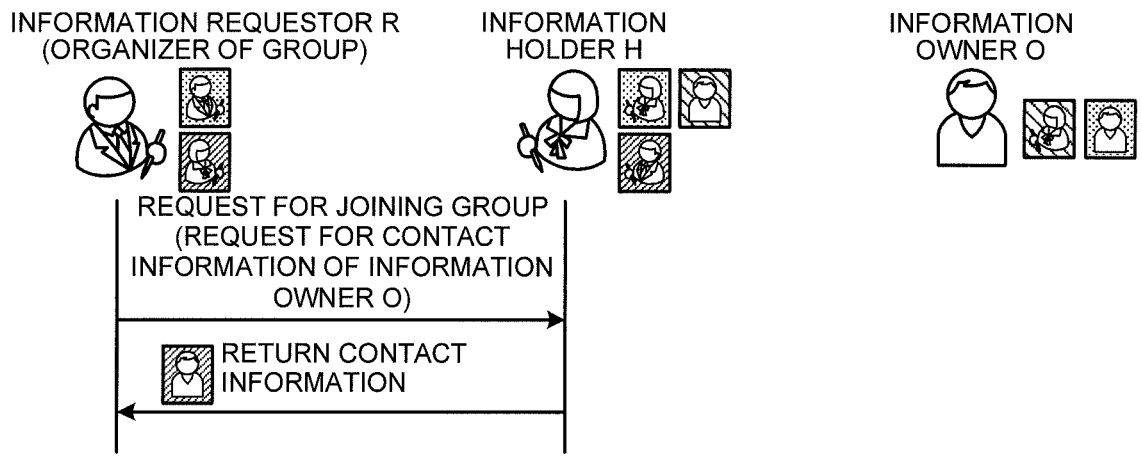
FIG. 3 is a schematic for explaining an information transmitting and receiving process performed when an information holder is granted with permission for secondary use of information.

A creation of a temporary group and an addition of a user will now be explained using a specific example with reference to FIGS. 3 to 9. FIG. 3 is a schematic for explaining an information transmitting and receiving process performed when the information holder is granted with permission for secondary use of the information. As illustrated in FIG. 3, there is an information requestor R who is the organizer of a group, an information holder H who is a member of the group, and an information owner O who is not a member of the group. In this example illustrated in FIG. 3, the information holder H is granted with permission for secondary use of the information by the information owner O.

In such a situation, when the information holder H receives a request for joining the group from the information requestor R, because the information holder H is already granted with the permission for secondary use from the information owner O in advance, the information holder H gives a reply of contact information of the information owner O to the information requestor R without contacting the information owner O.

Figure 4:
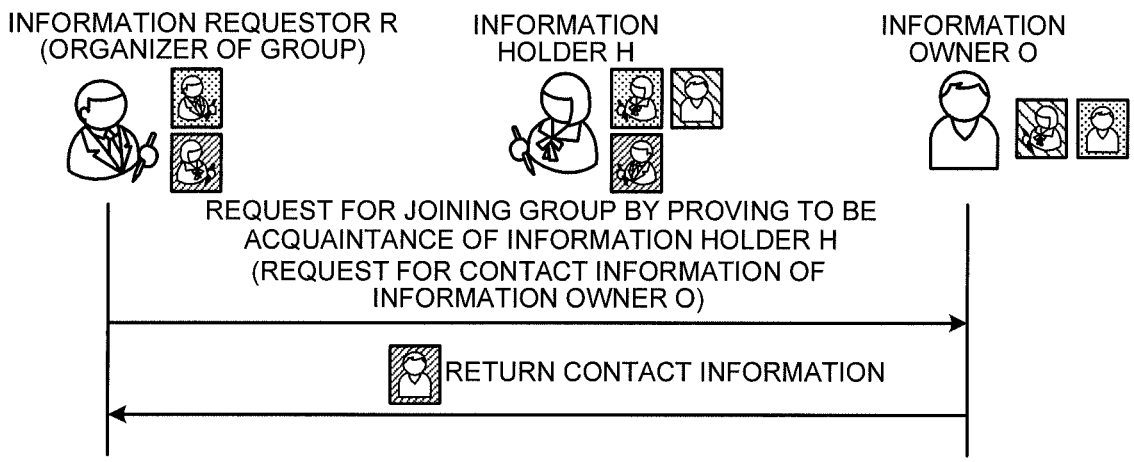
FIG. 4 is a schematic for explaining an information transmitting and receiving process performed when a contact is directly made to an information owner.

In the example of FIG. 4, an information transmitting and receiving process performed when a contact is directly made to the information owner will be explained. FIG. 4 is a schematic for explaining the information transmitting and receiving process performed when a contact is directly made to the information owner. As illustrated in FIG. 4, to contact the information owner directly, the information requestor R proves that the information requestor R is an acquaintance of the information holder H, and requests the information owner to join the group.

The information owner O checks the personal information of the information holder H, and if the information owner O is able to confirm that the information requestor R is an acquaintance of the information holder H, the information owner O replies with his/her own contact information to the information requestor R.

Figure 5:
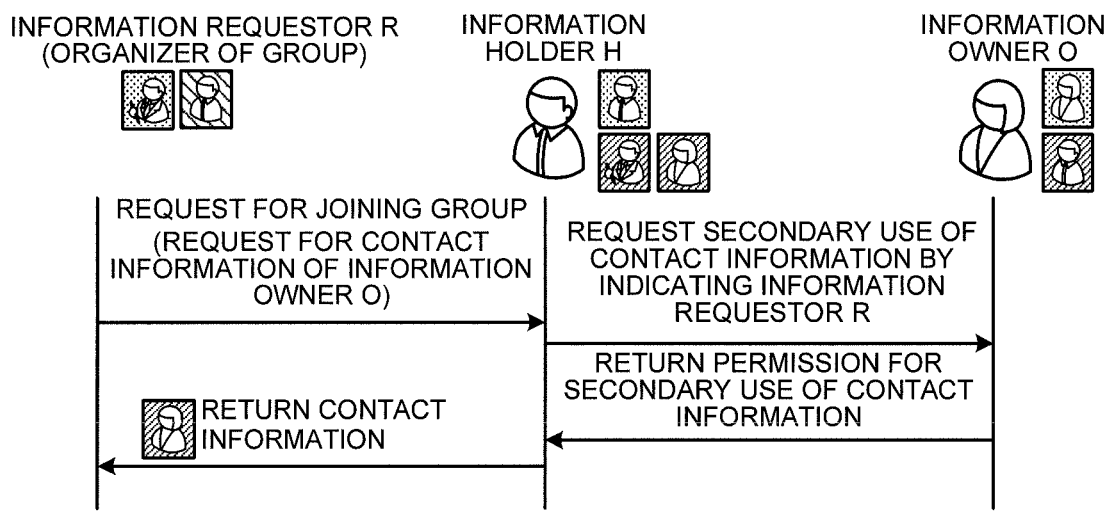
FIG. 5 is a schematic for explaining an information transmitting and receiving process performed when the information holder acts as an intermediary.

An information transmitting and receiving process performed when the information holder acts as an intermediary will now be explained. FIG. 5 is a schematic for explaining the information transmitting and receiving process performed when the information holder acts as an intermediary. As illustrated in FIG. 5, when the information holder H receives a request for joining the group from the information requestor R, the information holder H makes a request for secondary use of the contact information from the information owner O by indicating the information requestor R.

Figure 6:
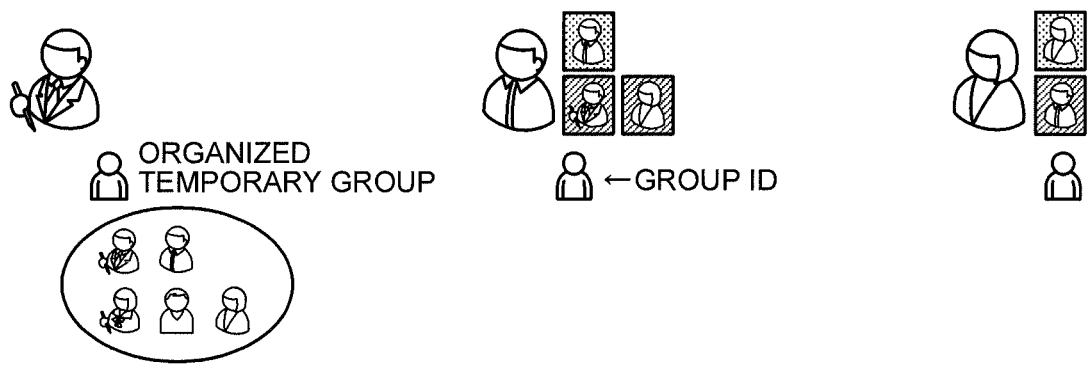
FIG. 6 is a schematic for explaining information held by each member of an organized group.

As a result of the user joining the temporary group illustrated in FIGS. 3 to 5, it is considered that the temporary group is organized at the point when the user who organizes the group (the left end user in the example illustrated in FIG. 6) collects the contact information as illustrated in FIG. 6. In the temporary group thus organized, different levels of restrictions are applied of information use owned by other users and held by each of these users (in other words, whether the secondary use of the information is permitted).

Figure 7:
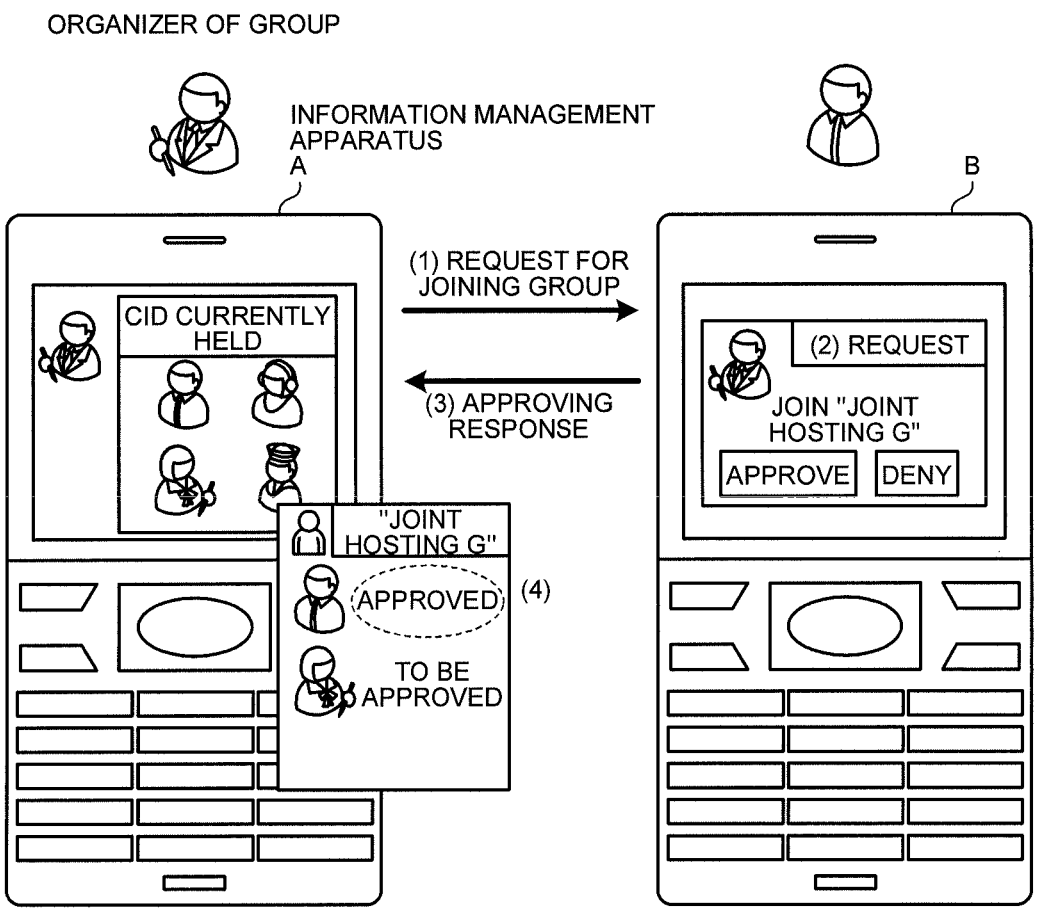
FIG. 7 is a schematic for explaining a process of adding an acquaintance to a temporary group.
Figure 8:
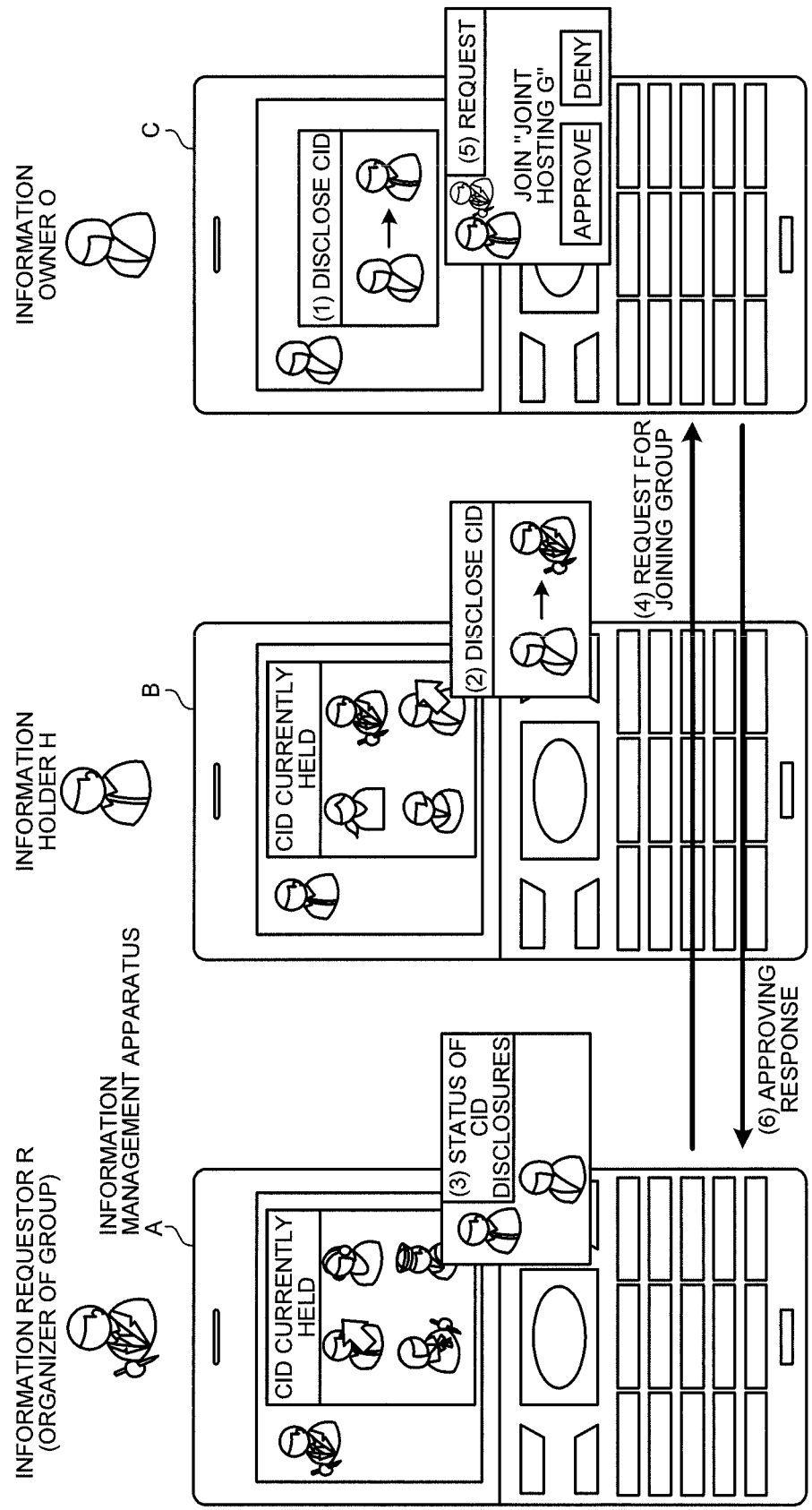
FIG. 8 is a schematic for explaining the process of adding an acquaintance to a temporary group.
Figure 9:
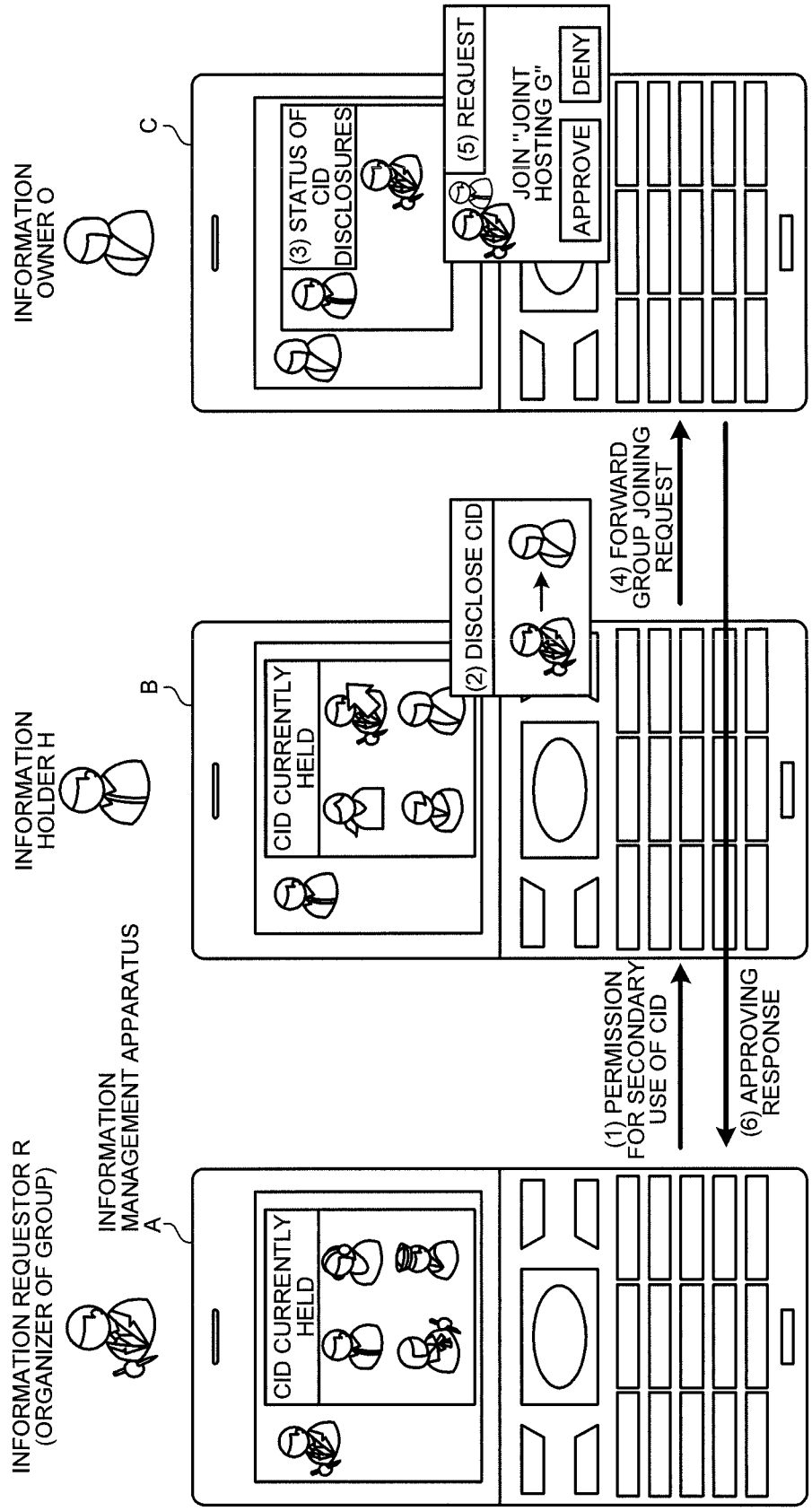
FIG. 9 is a schematic for explaining the process of adding an acquaintance to a temporary group.

A concept of an application of how a user is added to a temporary group will now be explained. FIGS. 7 to 9 are a schematic for explaining a process of adding an acquaintance to a temporary group. To explain using an example of different universities jointly hosting some event, a range of users who are acquaintances of a user belonging to a university A is different from that of a user belonging to a university B. It can be expected that the leader of each of these universities is acquainted of the other, but the connections among other users are only up to a level of knowing each other via their leaders. Under such a circumstance, if an organizer of a group attempts to organize a temporary group "joint hosting G", as illustrated in FIG. 7, an information management apparatus A of the group organizer transmits a request to join the group to the other information management apparatuses.

In response, an information management apparatus B receiving the request for joining the group displays a window for causing the user to select whether to approve or to deny the request for joining the temporary group "joint hosting G". If the user selects to approve joining the temporary group "joint hosting G", the information management apparatus B transmits a approving response and a contact identification (CID) with a restriction on the secondary use to the information management apparatus A.

When the information management apparatus A receives the approving response, the information management apparatus A displays that the approval has been made, and stores therein the CID. CID mentioned herein is a unique identifier of a communicating entity. A telephone number in the case of a telephone and an internet protocol (IP) address in the case of the Internet are CIDs based on the respective communication protocols.

An example in which an acquaintance of an acquaintance is added to a temporary group will be explained with reference to FIG. 8. If the CID disclosed by the information owner O to the information holder H is set to permit the secondary use, the information management apparatus B of the information holder H discloses the CID of the information owner O to the information requestor R, as illustrated in FIG. 8.

The information management apparatus A then stores therein the CID of the information owner O that has been disclosed to the information holder H as information that is permitted for the primary use, and notifies a request for joining the group to the information management apparatus C of the information owner O using the CID. When the information management apparatus C receives a selection of an approval for joining the group, the information management apparatus C transmits the approving response to the information management apparatus A.

An example in which an acquaintance of an acquaintance is added to a temporary group will be explained with reference to FIG. 9. The information management apparatus A of the information requestor R notifies that the secondary use of his/her CID is permitted and notifies a request for forwarding a request for joining the group to a terminal that is not maintained the CID of information requestor R to the information management apparatus B of the information holder H as illustrated in FIG. 9. The information management apparatus B stores therein that the CID of the information requestor R is permitted for the secondary use. The information manager apparatus B discloses the CID of the information requestor R with permission for primary use to the information owner O. In response to this disclosure, the information management apparatus C of the information owner O stores therein, as a CID disclosure status, that the information holder H is holding the CID of the information requestor R.

The information management apparatus B then forwards the request for joining the group to the information owner O. The information management apparatus C displays a window for causing the user to select whether to approve or to deny the request for joining the temporary group "joint hosting G". If the user selects to approve joining the temporary group "joint hosting G", the information management apparatus C transmits a response being an approval, and the CID of the information owner O him/herself applied with a restriction of the secondary use to the information management apparatus A.

Figure 10:
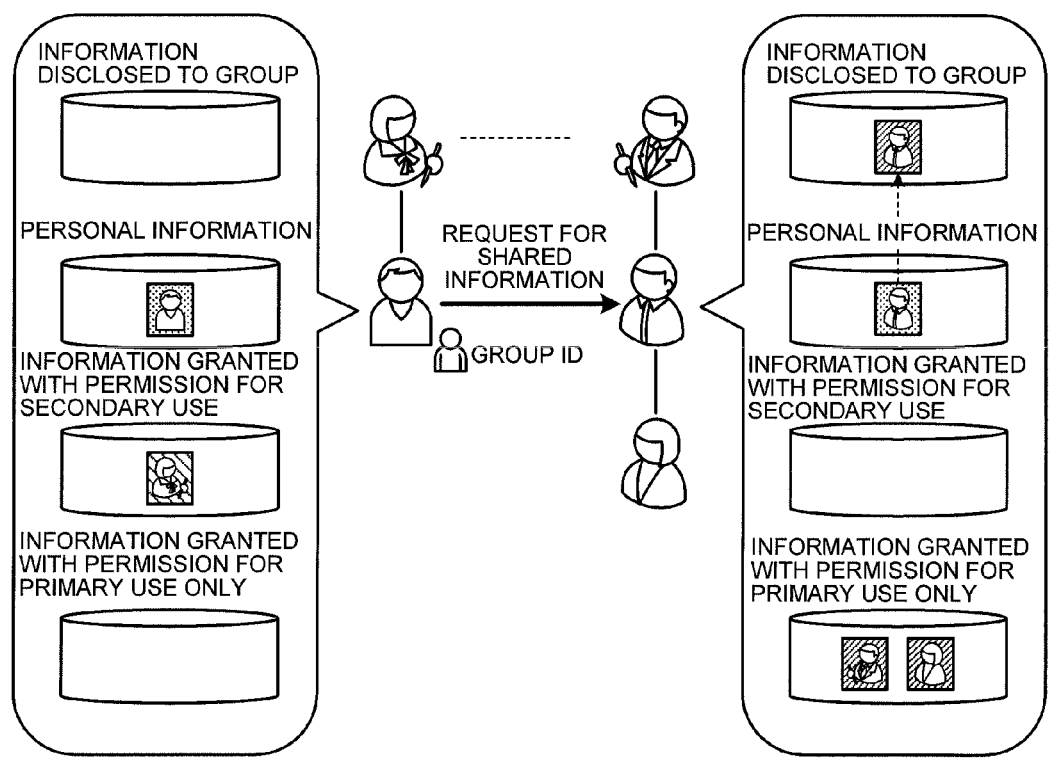
FIG. 10 is a schematic for explaining information shared by each member of a group.

In other words, the information management apparatus 10 of each of the users in the temporary group maintains information granted with permission for primary use that permits local use of the information only on the apparatus, and information granted with permission for secondary use that permits forwarding of information to other terminals, as illustrated in FIG. 10. Furthermore, the information management apparatus 10 can set information for permitting disclosure only within the group to the private information. In this manner, when information is shared in a temporary group, the information management apparatus 10 of each user can share information securely by allowing the information to be disclosed while restricting use of the private information of each user, instead of obtaining information by accessing the organizer of the group.

Figure 11:
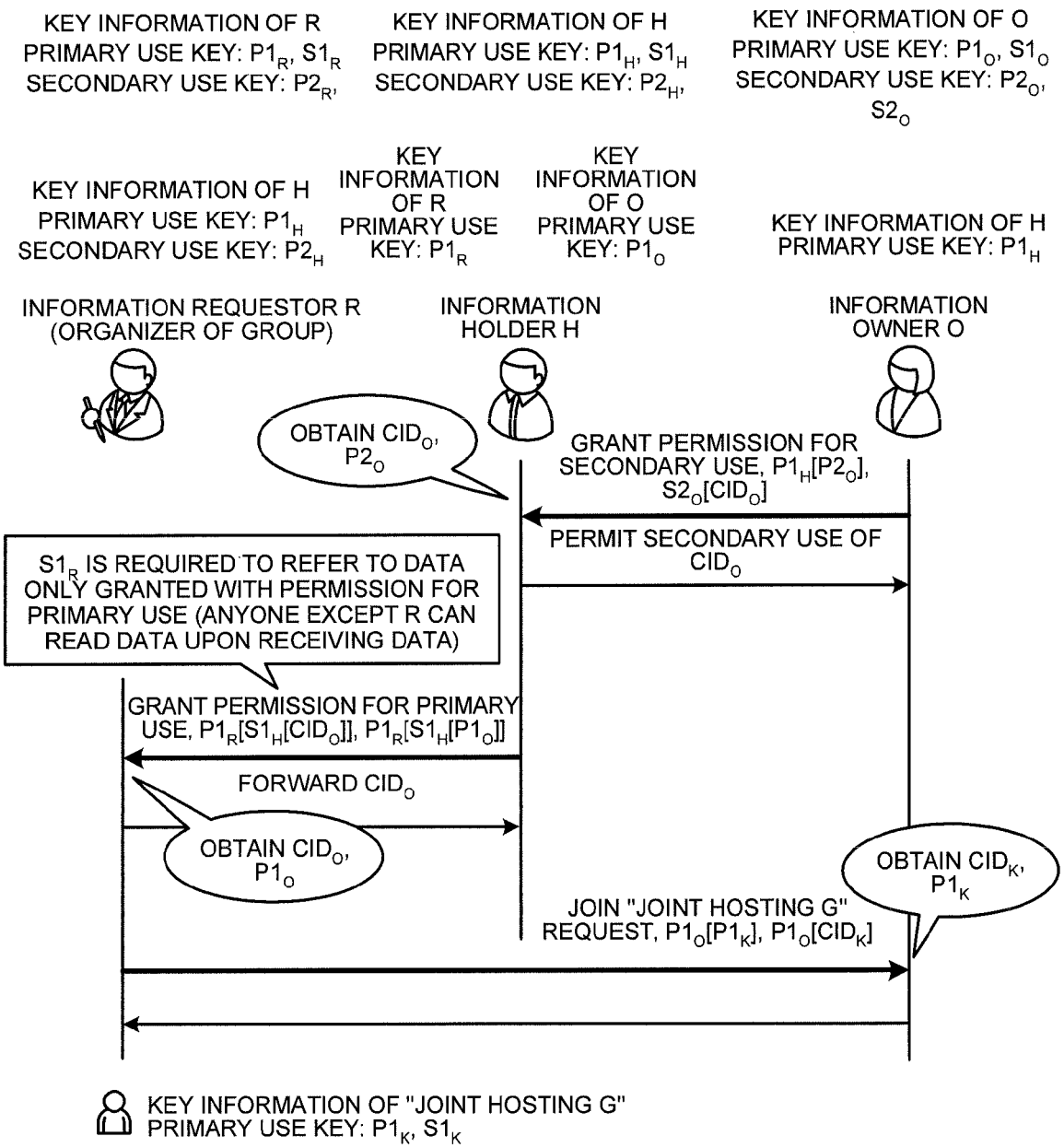
FIG. 11 is a schematic illustrating a process how a requestor of information obtains the information when the information holder is granted with permission for secondary use by the information owner.
Figure 12:
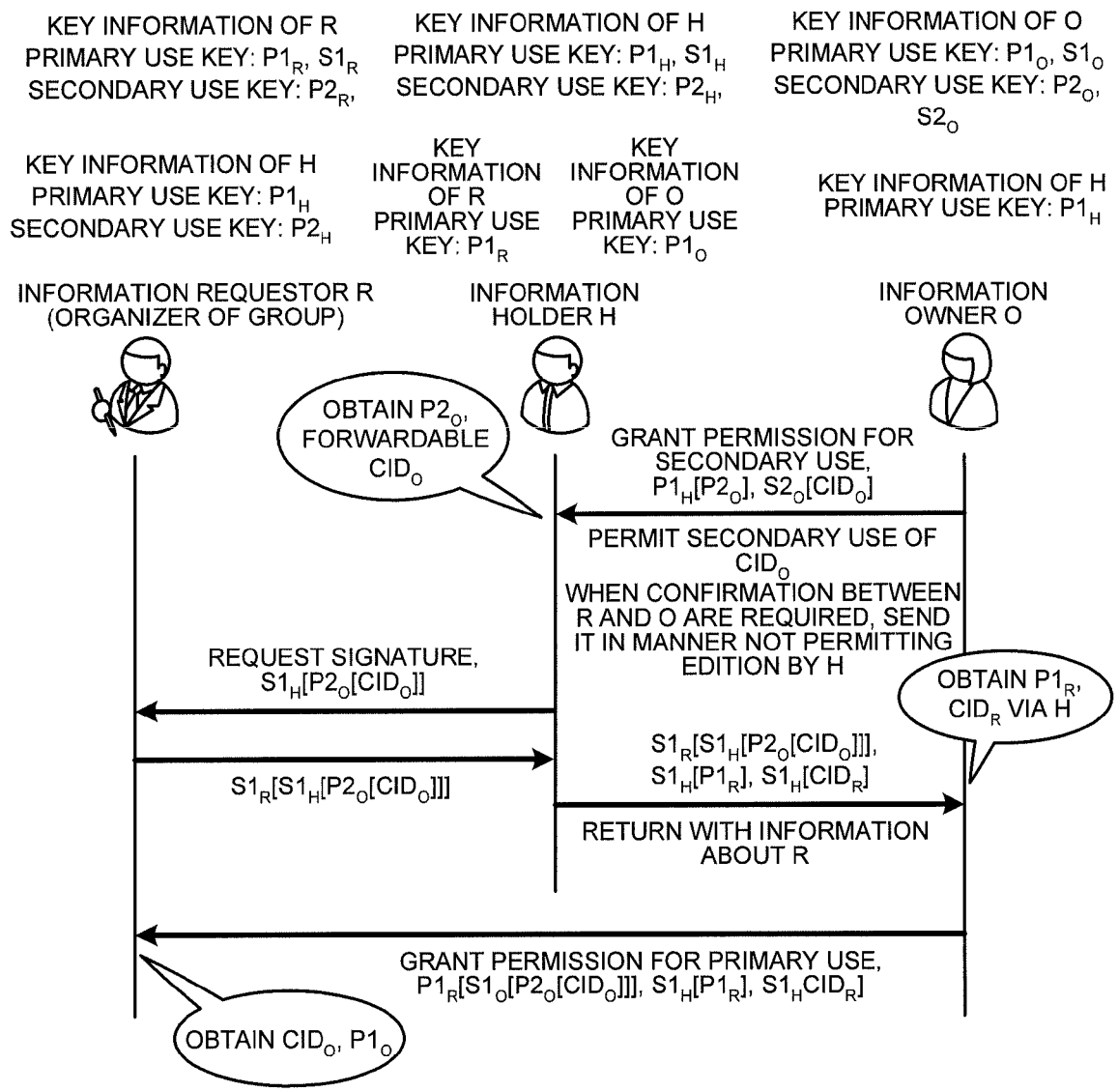
FIG. 12 is a schematic illustrating a process how a requestor of information obtains the information when the information holder is granted with permission for secondary use by the information owner.

A process in which an requestor of information obtains the information when the information holder is granted with permission to make secondary use by the information owner will now be explained using a specific example with reference to FIGS. 11 and 12. FIGS. 11 and 12 are schematics illustrating a process how a requestor of information obtains the information when the information holder is granted with permission for secondary use by the information owner. In FIGS. 11 and 12, a key pair, public key P and private key S use same index, e.g. P1 and S1.

As illustrated in FIG. 11, when the information owner O specifies that the secondary use is permitted to the information holder H, the information management apparatus C of the information owner O transmits $P1_H[P2_O]$, $S2_O[CID_O]$ to the information management apparatus B of the information holder H. The information management apparatus B then decrypts $P1_H[P2_O]$, $S2_O[CID_O]$ to obtain $P2_O$ and $CID_O$. The information management apparatus B then converts the permission level from the secondary use to the primary use, and forwards $P1_R[S1_H[CID_O]]$, $P1_R[S1_H[P1_O]]$ to the information management apparatus A of the information requestor R. In other words, because $S1_R$ is used to refer to the data to which only the permission for primary use is granted, no one except the information requestor R can read such information even if such a person receives the information.

The information management apparatus A then performs a decrypting process to obtain $CID_O$ and $P1_O$, and transmits a request for joining the joint hosting G and $P1_O[P1_K]$, $P1_O[CID_K]$ to the information management apparatus C. The information management apparatus C then performs the decryption process to obtain $CID_K$ and $P1_K$.

In the example illustrated in FIG. 11, explained is an example in which no identification check is performed when the information holder H forwards the information of the information owner O. In FIG. 12, an example in which an identification check is performed will be explained. As illustrated in FIG. 12, the information management apparatus C of the information owner O transmits $P1_H[P2_O]$, $P2_O[CID_O]$ to the information management apparatus B of the information holder H. The information management apparatus B then decrypts $P1_H[P2_O]$, $P2_O[CID_O]$ to obtain $P2_O$ and $CID_O$.

To obtain permission of the information owner O for displaying $CID_O$ to the information requestor R, the information management apparatus B transmits $S1_H[P2_O]$, $[CID_O]$ requesting a signature of the user R to the information management apparatus A. In response to the request, the information management apparatus A performs signature by locking the information received from the information management apparatus B as it is using the key $S1_R$ of the information requestor R, and transmits $S1_R[S1_H[P2_O], [CID_O]]$ to the information management apparatus B.

The information management apparatus B transmits $S1_K[S1_H[P2_O[CID_O]]]$ received from the information management apparatus A and $S1_H[P1_R]$, $S1_H[CID_R]$ as information of the information requestor R appended thereto to the information management apparatus C. The information management apparatus C performs the decryption process to obtain $CID_R$ using $P1_R$. As a result, the information management apparatus C becomes able to communicate with the information management apparatus A, and the information management apparatus C sets permission for primary use by the information management apparatus A to the information of the information owner O, to produce $P1_R[S1_O[CID_O]]$, $P1_R[S1_O[P1_O]]$, and transmits it to the information management apparatus A directly, not via the information management apparatus B this time. The information management apparatus A performs the decryption process to obtain $P1_O$, $CID_O$.

Figure 13:
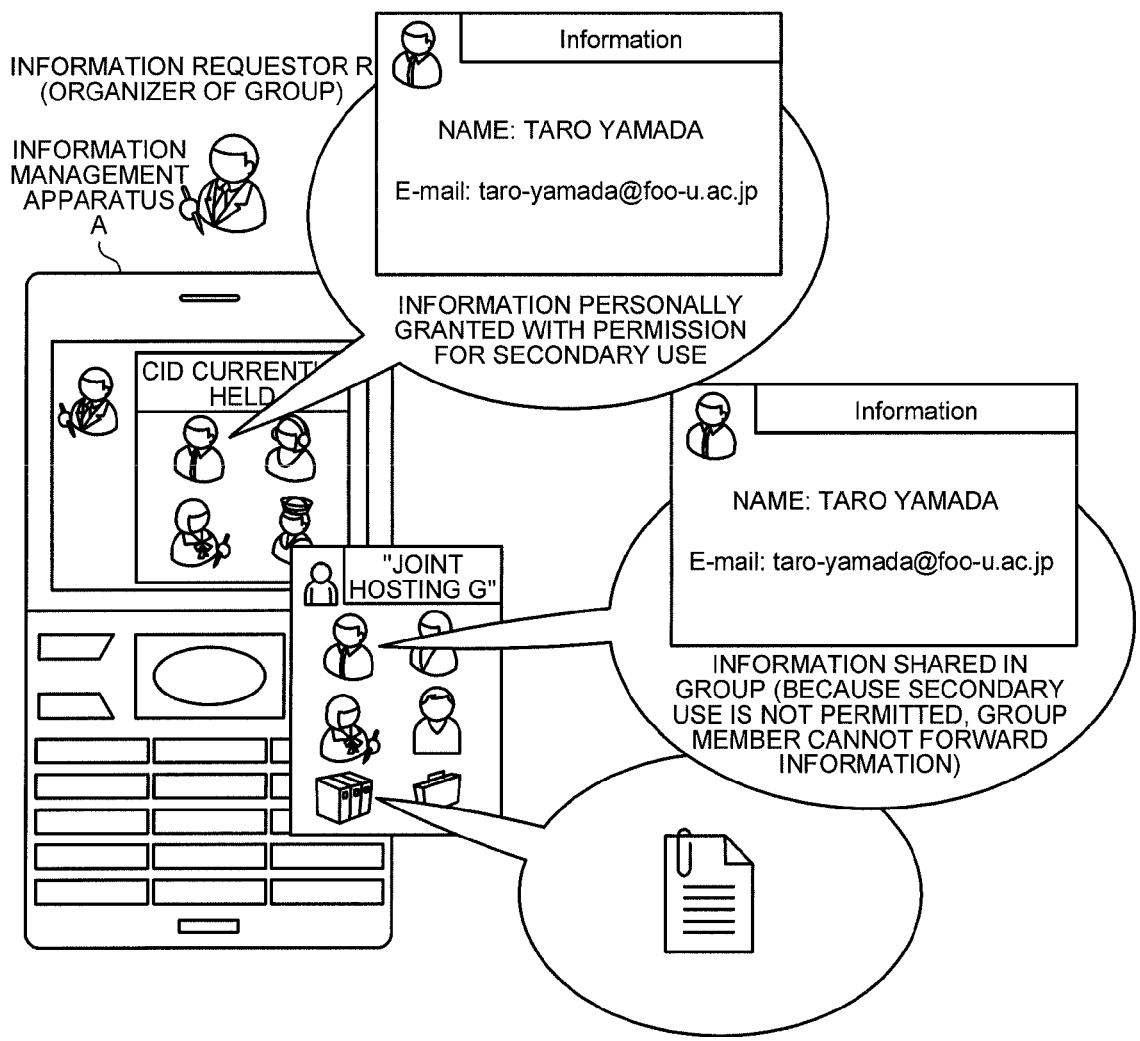
FIG. 13 is a schematic for explaining information sharing in a temporary group.

Information sharing in a temporary group will now be explained with reference to FIG. 13. FIG. 13 is a schematic for explaining information sharing in the temporary group. As illustrated in FIG. 13, the information management apparatus 10 stores therein information personally granted with permission for secondary use, and shared information that the group members may not be able to forward because the permission for secondary use is not granted. Therefore, the information owner can control restrictions on use of the information depending on the information owner.

Figure 14:
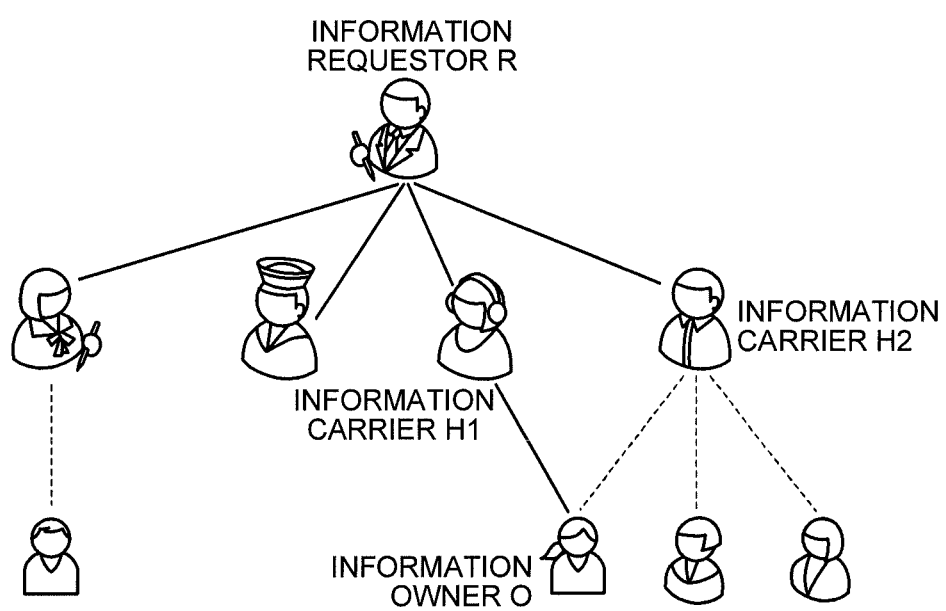
FIG. 14 is a schematic for explaining a process of retrieving information that is externally disclosed.

FIG. 14 is a schematic for explaining a process of retrieving information that is externally disclosed. As illustrated in FIG. 14, when the information requestor R requests information of the information owner O, the information requestor R can connect to the information owner O via one of the information holders H1 and H2. In the example illustrated in FIG. 14, because the information requestor R can find out the CID of the information owner O via the connection between the information holder H1 and the information owner O, the communication can be performed via H1.

In this manner, depending on the structure of the temporary group, information can be shared in a group without confirmation of users. Furthermore, as to the information sharing, members of the group can access the same piece of data, or each member can access information that individual member discloses to the group on his/her own terminal. In this manner, information can be shared in a manner suitable for the situation.

Figure 15:
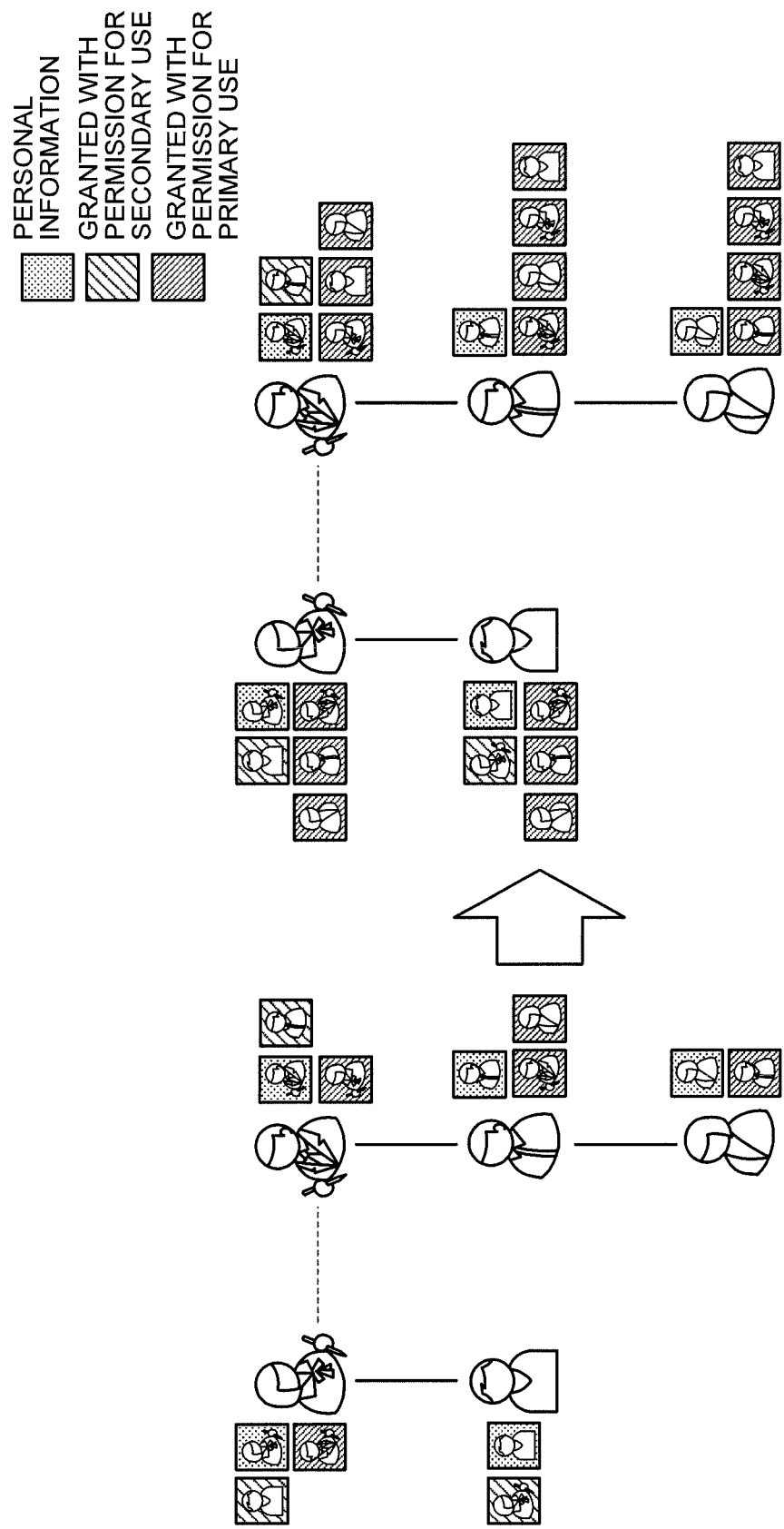
FIG. 15 is a schematic for explaining information shared by each member of a group.

A specific example of how the information management apparatus is applied will now be explained with reference to FIG. 15. FIG. 15 is a schematic for explaining how information is share among the members of a group. For example, in the example of two universities hosting some joint event together, there is no attribute that is common among all of the members, and not everyone in the same university is an acquaintance to each other. Therefore, contact information is shared while restrictions applied on use of the information after the owner of information provides the information. As illustrated in FIG. 15, each user owning information can select either to set the permission for secondary use to the information or to set the permission for primary use to the information, depending on the relationship of the user to the information holder.

Processes Performed by Information Management Apparatus

Figure 16:
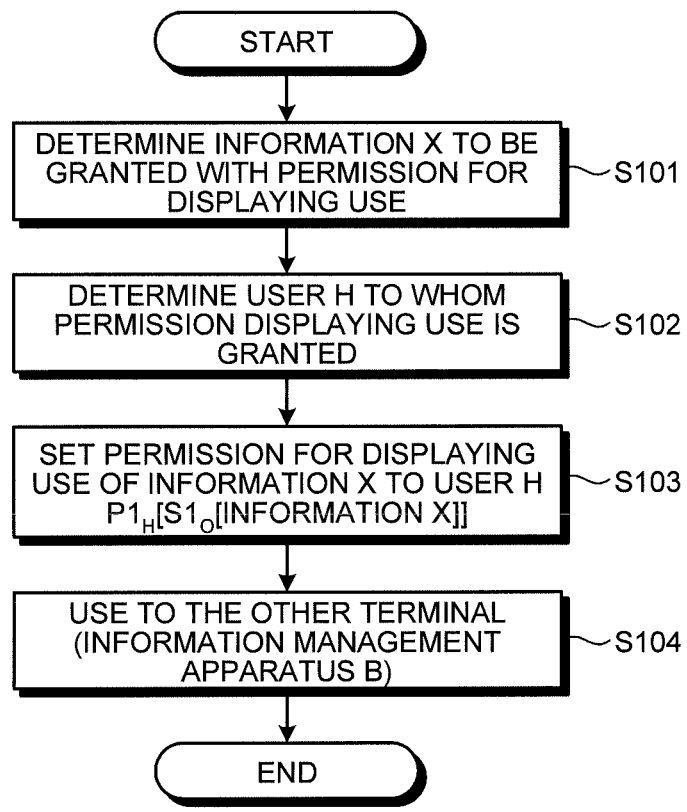
FIG. 16 is a flowchart illustrating a process performed by the information management apparatus according to the second embodiment.
Figure 17:
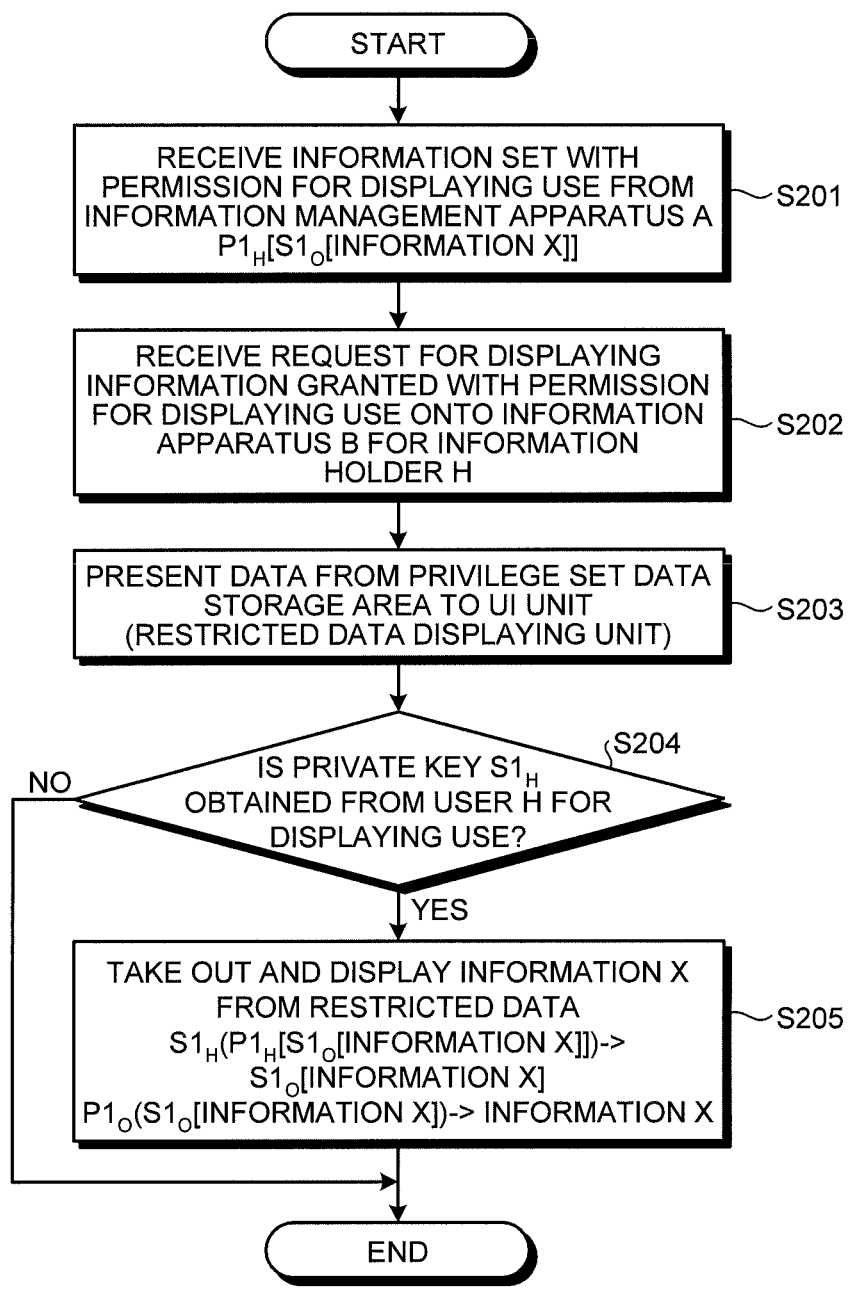
FIG. 17 is a flowchart illustrating a process performed by the information management apparatus according to the second embodiment.
Figure 18:
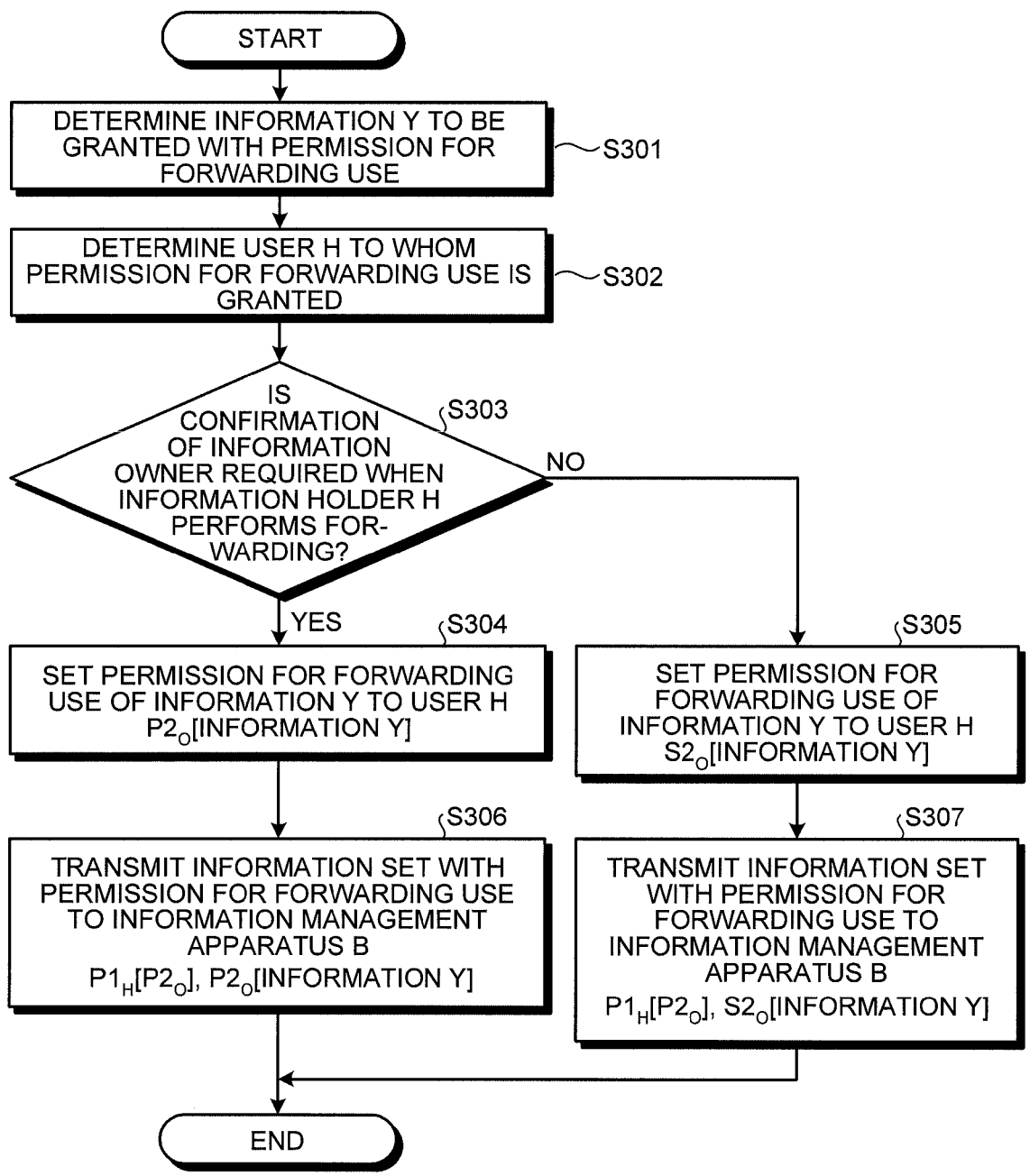
FIG. 18 is a flowchart illustrating a process performed by the information management apparatus according to the second embodiment.
Figure 19:
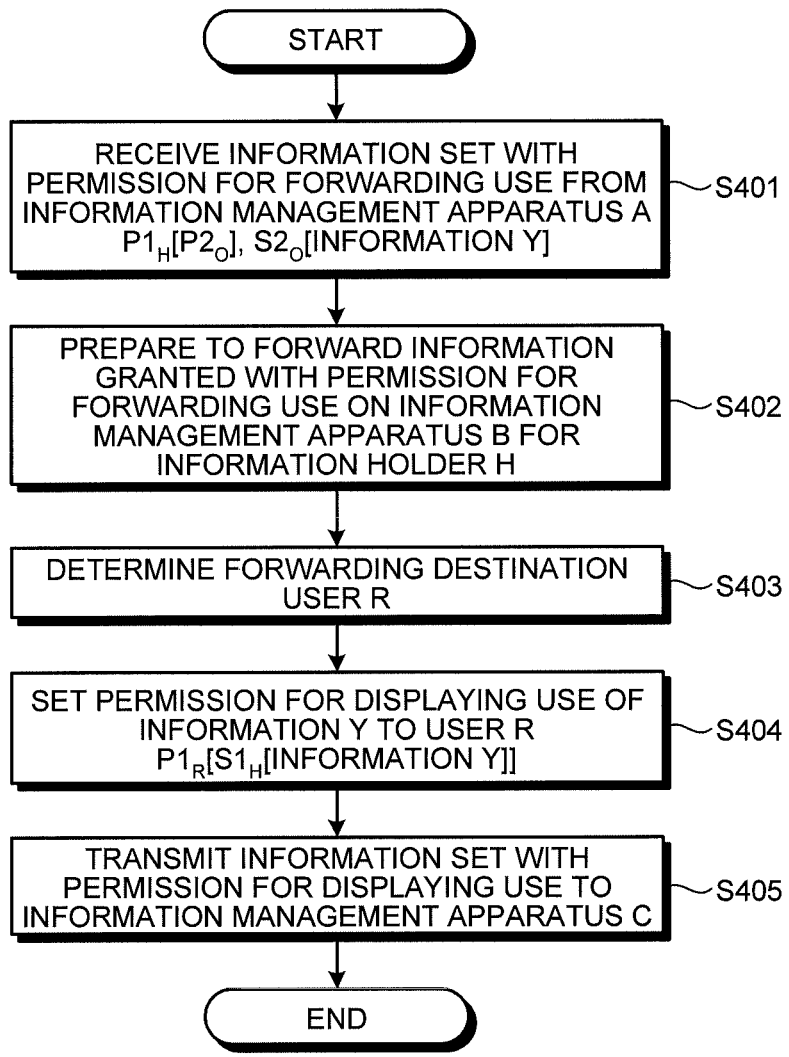
FIG. 19 is a flowchart illustrating a process performed by the information management apparatus according to the second embodiment.
Figure 20:
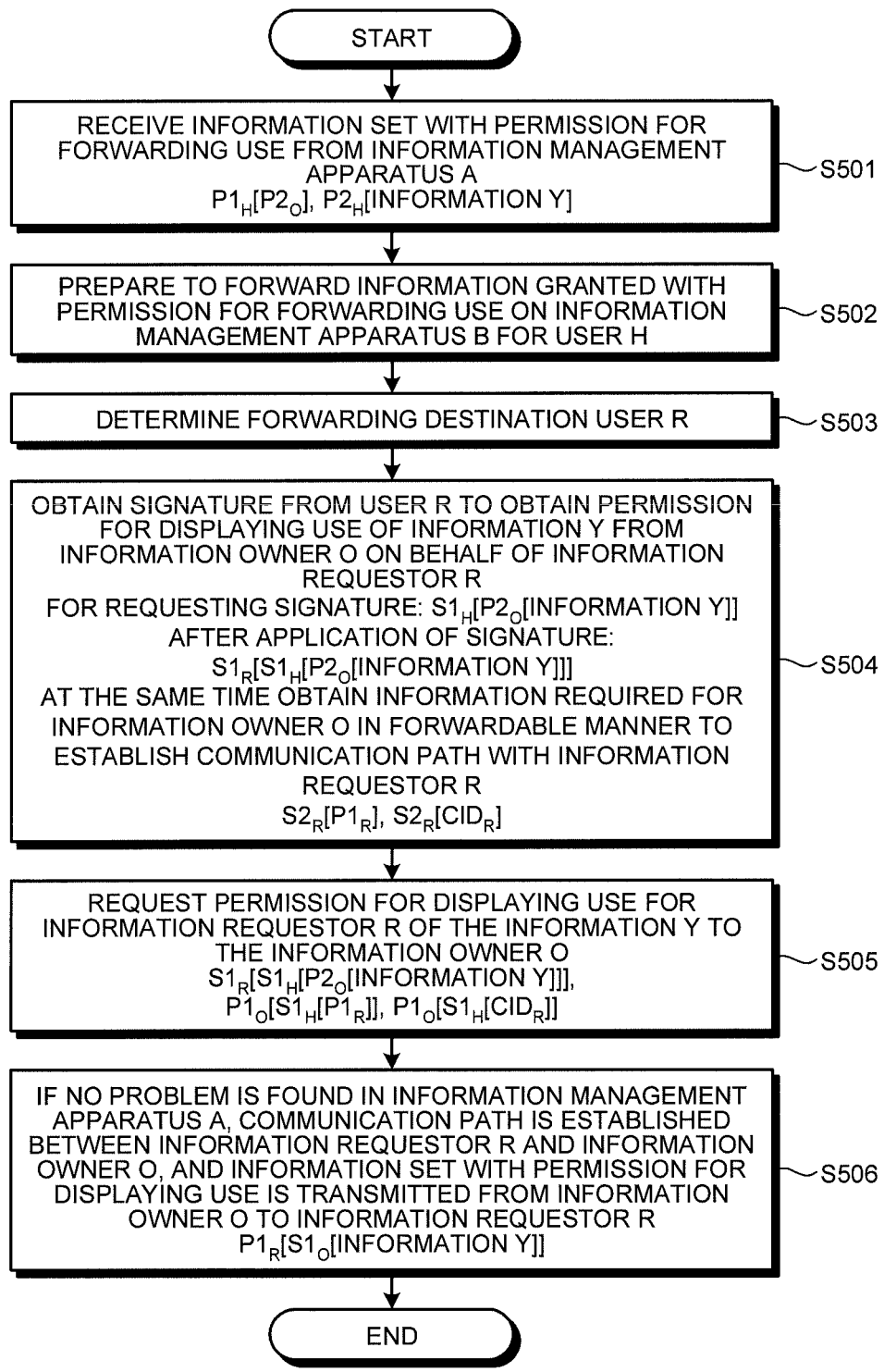
FIG. 20 is a flowchart illustrating a process performed by the information management apparatus according to the second embodiment.
Figure 21:
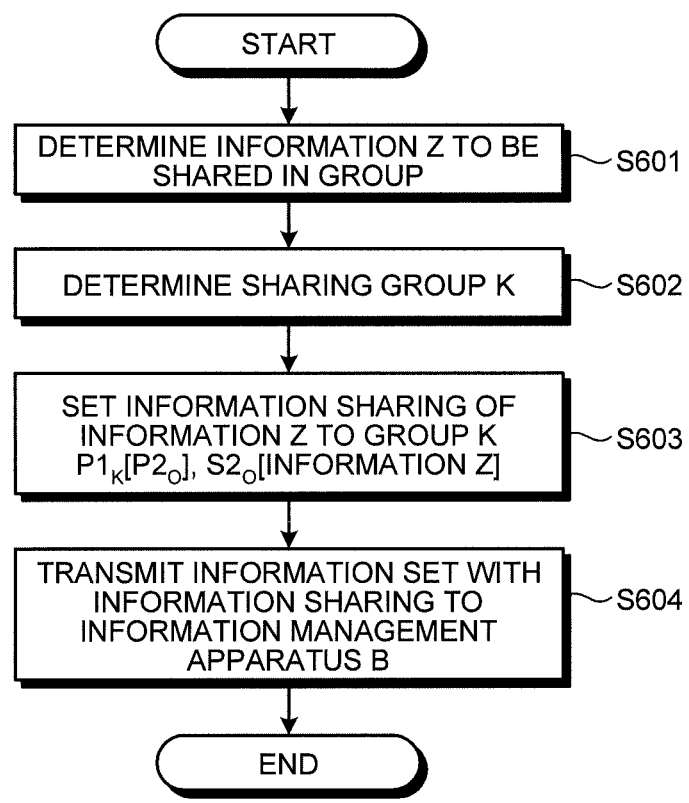
FIG. 21 is a flowchart illustrating a process performed by the information management apparatus according to the second embodiment.
Figure 22:
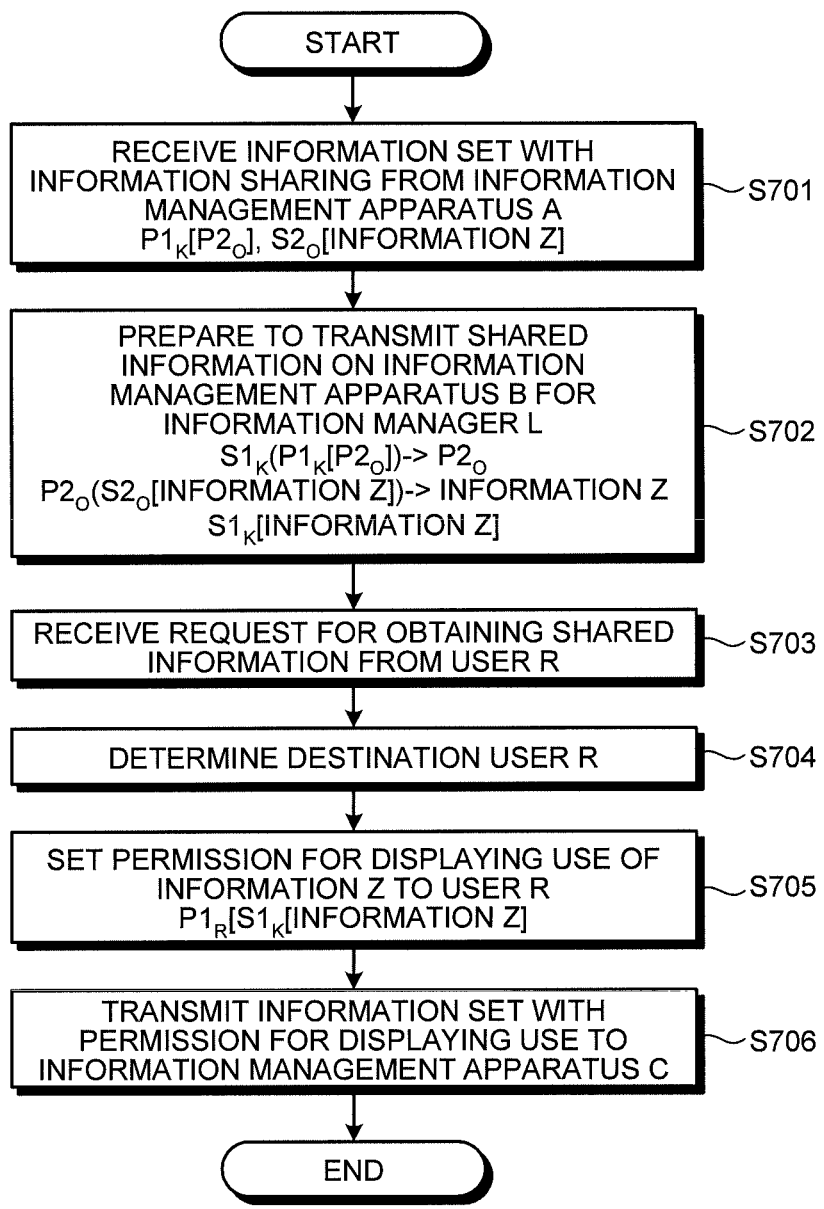
FIG. 22 is a flowchart illustrating a process performed by the information management apparatus according to the second embodiment.

Processes performed by the information management apparatus 10 according to the second embodiment will now be explained with reference to FIGS. 16 to 22. FIGS. 16 to 22 are flowcharts illustrating processes performed by the information management apparatus 10 according to the second embodiment. FIG. 16 illustrates a process of setting permission for displaying use performed by the information management apparatus. FIG. 17 illustrates a process of displaying the information set with permission for displaying use onto the information management apparatus. FIG. 18 illustrates a process of setting permission for forwarding use performed by the information management apparatus. FIG. 19 illustrates a process of directly forwarding the information performed by the information management apparatus. FIG. 20 illustrates a process of confirming the information owner and then forwarding the information performed by the information management apparatus. FIG. 21 illustrates a process of setting the information to be shared in the group performed by the information management apparatus. FIG. 22 illustrates a process of obtaining the information shared in the group performed by the information management apparatus.

A process of setting permission for displaying use performed by the information management apparatus will now be explained. FIG. 16 illustrates the process of setting permission for displaying use performed by the information management apparatus. In the example illustrated in FIG. 16, an information management apparatus A is a source terminal and is a terminal used by the information owner O, and owns contact ID "$CID_O$", a public key "$P1_O$", a private key "$S1_O$", and information "X". The information management apparatus B that is a destination is a terminal of the user H, and owns contact ID "$CID_H$", a public key "$P1_H$", and a private key "$S1_H$".

As illustrated in FIG. 16, the information management apparatus A receives an instruction for determining the information X for which displaying use is to be permitted (Step S101), and receives an instruction for determining the user H to whom the permission for displaying use is to be set (Step S102).

The information management apparatus A then sets permission for displaying use of the information X for the user H. More specifically, the information management apparatus A sets $P1_H[S1_O[information X]]$ (Step S103). $P1_H$ herein is a public key, and $S1_O$ is a private key. The information management apparatus A then transmits the information set with the permission for displaying use to the other information management apparatus B (Step S104).

A process of displaying the information set with permission for displaying use onto the information management apparatus will now be explained. FIG. 17 illustrates the process of displaying the information set with permission for displaying use onto the information management apparatus. In the example illustrated FIG. 17, the information management apparatus A is a source terminal and is a terminal used by the information owner O, and owns the contact ID "$CID_O$", the public key "$P1_O$", the private key "$S1_O$", and the information "X". The information management apparatus B that is a destination is a terminal of the information holder H, and owns the contact ID "$CID_H$", the public key "$P1_H$", and the private key "$S1_H$".

As illustrated in FIG. 17, the information management apparatus B receives "$P1_H[S1_O[\text{information X}]]$" that is information set with permission for the displaying use from the information management apparatus A (Step S201). When the information management apparatus B receives a request for displaying the information set with the permission for displaying use on the information management apparatus B for the information holder H (Step S202), the information management apparatus B presents the data from the privilege set data storage area 11 to the restricted data displaying unit 14a in the UI unit 14 (Step S203).

The information management apparatus B determines if the private key "$S1_H$" to be used in displaying the information is received from the user H (Step S204). If the private key is received, the information management apparatus B takes out the information X from the restricted data, and displays the information X (Step S205).

A process of setting permission for forwarding use performed by the information management apparatus will now be explained. FIG. 18 illustrates the process of setting permission for forwarding use performed by the information management apparatus. In the example illustrated FIG. 18, the information management apparatus A is a source terminal and is a terminal used by the information owner O, and owns the contact ID "$CID_O$", the public key "$P1_O$", the private key "$S1_O$", and information "Y". The information management apparatus A also owns a public key "$P2_O$" to be used in forwarding and a private key "$S2_O$" to be used in forwarding. The information management apparatus B that is a destination is a terminal of the information holder H, and owns the contact ID "$CID_H$", the public key "$P1_H$", and the private key "$S1_H$".

As illustrated in FIG. 18, the information management apparatus A receives an instruction for determining the information Y for which the forwarding use is to be permitted (Step S301), and receives an instruction for determining the user H to whom forwarding use is to be permitted (Step S302). At this time, the information management apparatus A determines if a confirmation of the information owner is performed when the information holder H performs the forwarding (Step S303).

As a result, if a confirmation of the information owner is performed, the information management apparatus A sets permission for forwarding use of the information Y "$P2_O[\text{information Y}]$" for the user H (Step S304). If no confirmation of the information owner is performed, the information management apparatus A sets up permission for forwarding use of the information "$S2_O[\text{information Y}]$" for the user H (Step S305).

The information management apparatus A then transmits the information set with permission for forwarding use to the information management apparatus B (Step S306). In other words, when a confirmation of the information owner is performed, the information management apparatus A transmits the information set with permission for forwarding use "$P1_H[P2_O], P2_O[\text{information Y}]$". When no confirmation of the information owner is performed, the information management apparatus A transmits the information set with permission for forwarding use "$P1_H[P2_O], S2_O[\text{information Y}]$" (Step S307).

A process of directly forwarding the information performed by the information management apparatus will now be explained. FIG. 19 illustrates the process of directly forwarding the information performed by the information management apparatus. In the example illustrated FIG. 19, the information management apparatus A is a source terminal and is a terminal used by the information owner O, and owns the contact ID "$CID_O$", the public key "$P1_O$", the private key "$S1_O$", and the information "Y". The information management apparatus B that is a destination is a terminal of the information holder H, and owns the contact ID "$CID_H$", the public key "$P1_H$", and the private key "$S1_H$". The information management apparatus C is a terminal owned by the information requestor R, and owns contact ID "$CID_R$" and a public key "$P1_R$".

As illustrated in FIG. 19, when the information management apparatus B receives the information set with permission for forwarding use "$P1_H[P2_O], S2_O[\text{information Y}]$" from the information management apparatus A (Step S401), the information management apparatus B makes a preparation to allow the information holder H to forward the information set with permission for using information Y forwarded by apparatus B (Step S402).

Once the information management apparatus B determines that the forwarding destination is the user R (Step S403), the information management apparatus B sets permission for displaying use of the information Y to the user R, which results in "$P1_R[S1_H[\text{information Y}]]$" (Step S404). The information management apparatus C then displays the information set with permission for displaying use (Step S405).

A process of forwarding the information after confirming the information owner performed by the information management apparatus will now be explained. FIG. 20 illustrates the process of forwarding the information after confirming the information owner performed by the information management apparatus. In the example illustrated FIG. 20, the information management apparatus A is a source terminal and is a terminal used by the information owner O, and owns the contact ID "$CID_O$", the public key "$P1_O$", the private key "$S1_O$", and the information "Y". The information management apparatus B that is a destination is a terminal of the user H, and owns the contact ID "$CID_H$", the public key "$P1_H$", and the private key "$S1_H$". The information management apparatus C is a terminal owned by the information requestor R, and owns the contact ID "$CID_R$", the public key "$P1_R$", and a public key "$P2_R$" to be used in forwarding.

As illustrated in FIG. 20, when the information management apparatus B receives the information set with permission for forwarding use "$P1_H[P2_O], P2_O[\text{information Y}]$" from the information management apparatus A (Step S501), the information management apparatus B makes a preparation to allow the user H to forward the information set with permission for using information Y forwarded by apparatus B (Step S502). Once the information management apparatus B determines that the forwarding destination is the user R (Step S503), the information management apparatus B obtains a signature from the user R so that permission for displaying use of the information Y can be obtained from the information owner O on behalf of the information requestor R (Step S504).

The information management apparatus B then requests permission for allowing R to display information Y from the information owner O (Step S505). If no problem is found in the information management apparatus A, the information management apparatus B enables a communication path to be established between the information owner O and the information requestor R, and the information set with permission for displaying use "$P1_R[S1_O[\text{information Y}]]$" is transmitted from the information owner O to the information requestor R (Step S506).

A process of setting the information to be shared in the group performed by the information management apparatus will now be explained. FIG. 21 illustrates the process of setting the information to be shared in the group performed by the information management apparatus. In the example illustrated in FIG. 21, the information management apparatus A is a source terminal and is a terminal used by the information owner O, and owns the contact ID "$CID_O$", the public key "$P1_O$", the private key "$S1_O$", the public key "$P2_O$" to be used in forwarding, the private key "$S2_O$" to be used in forwarding, and information "Z". The information management apparatus B that is a destination is a terminal of an information manager L, and owns contact ID "$CID_L$", a public key "$P1_L$,", and a private key "$S1_L$". The organizer of a group K to which the information owner O belongs is L, the contact ID of the group K is "$CID_K$", and the public key of the group K is "$P1_K$".

As illustrated in FIG. 21, when the information management apparatus A receives a decision about the information Z to be shared in the group (Step S601), and receives a decision about the sharing group K (Step S602), the information management apparatus A sets information sharing of the information Z to the group K (Step S603). The information management apparatus A transmits the information set with information sharing "$P1_K[P2_O], S2_O[\text{information Z}]$" to the information management apparatus B (Step S604).

A process of obtaining the information shared in the group performed by the information management apparatus will now be explained. FIG. 22 illustrates the process of obtaining the information shared in the group performed by the information management apparatus. In the example illustrated in FIG. 22, the information management apparatus A is a source terminal and is a terminal used by the information owner O, and owns the contact ID "$CID_O$", the public key "$P1_O$", the private key "$S1_O$", and the information "Z". The information management apparatus B that is a destination is a terminal of the information manager L, and owns contact ID "$CID_L$", the public key "$P1_L$", and the private key "$S1_L$". The information management apparatus C is a terminal owned by the information requestor R, and owns the contact ID "$CID_R$" and the public key "$P1_R$". The organizer of the group K to which the information owner O belongs is L, the contact ID of the group K is "$CID_K$", and the public key of the group K is "$P1_K$".

As illustrated in FIG. 22, the information management apparatus B receives the information set with information sharing from the information management apparatus A (Step S701), and makes a preparation to allow the information manager L to transmit the shared information from the information management apparatus B (Step S702).

Once the information management apparatus B receives a request for obtaining the shared information from the user R (Step S703), and determines that the destination is the user R (Step S704), the information management apparatus B sets permission for displaying use of the information Z to the user R (Step S705). The information management apparatus B then transmits the information set with the permission for displaying use to the information management apparatus C (Step S706).

Advantageous Effects Achieved by Second Embodiment

As described above, for a destination terminal that is not permitted to forward the information, the information management apparatus 10 sets a primary use key that permits use of information within a terminal to the information. For a destination terminal permitted to forward the information, the information management apparatus 10 sets a secondary use key that permits the information to be forwarded to the information. Furthermore, when information to which the primary use key is set is received from a source terminal, the information management apparatus 10 controls to permit the information to be used to be displayed locally on the apparatus. When information to which the secondary use key is set is received from a source terminal, the information management apparatus 10 controls to permit the information to be forwarded. As a result, the information owner can restrict use of information after providing such information.

Furthermore, according to the second embodiment, when information set with the secondary use key forwarded from a source terminal to another terminal, the information management apparatus 10 converts the information set with the secondary use key into information set with the primary use key, and forwards the information to the another terminal. Therefore, even when an information holder who is a direct acquaintance is permitted of secondary use, secondary use by someone who obtained the information via the information holder can be prevented.

Furthermore, according to the second embodiment, the information management apparatus 10 transmits a request for joining a group, and receives a response to the group joining request thus transmitted. Therefore, a group can be organized on the information management apparatus 10 not via a server, for example. Therefore, the information management apparatus 10 inquires apparatuses located nearby all at once, and obtains information of the nearby apparatuses from the nearby apparatuses. Alternatively, the information obtained from the other apparatuses may not have to be the information of the other apparatuses themselves.

Furthermore, according to the second embodiment, an intermediating terminal that intermediates a transmission and a reception of information between a source terminal and a destination terminal requests a signature from a destination terminal. The destination terminal requested of the signature transmits the signature to the intermediating terminal. The intermediating terminal forwards the signature thus transmitted to the source terminal, and the source terminal transmits the information set with the first control information to the destination terminal using the signature thus forwarded. Therefore, information can be provided to a requestor of the information via the intermediating terminal, and the information owner can restrict use of the information after providing the information.

Third Embodiment

In the second embodiment, an example in which information shared in a group is maintained on the information management apparatus of a user is explained. However, embodiments are not limited thereto. The shared information may be maintained on an external terminal.

Figure 23:
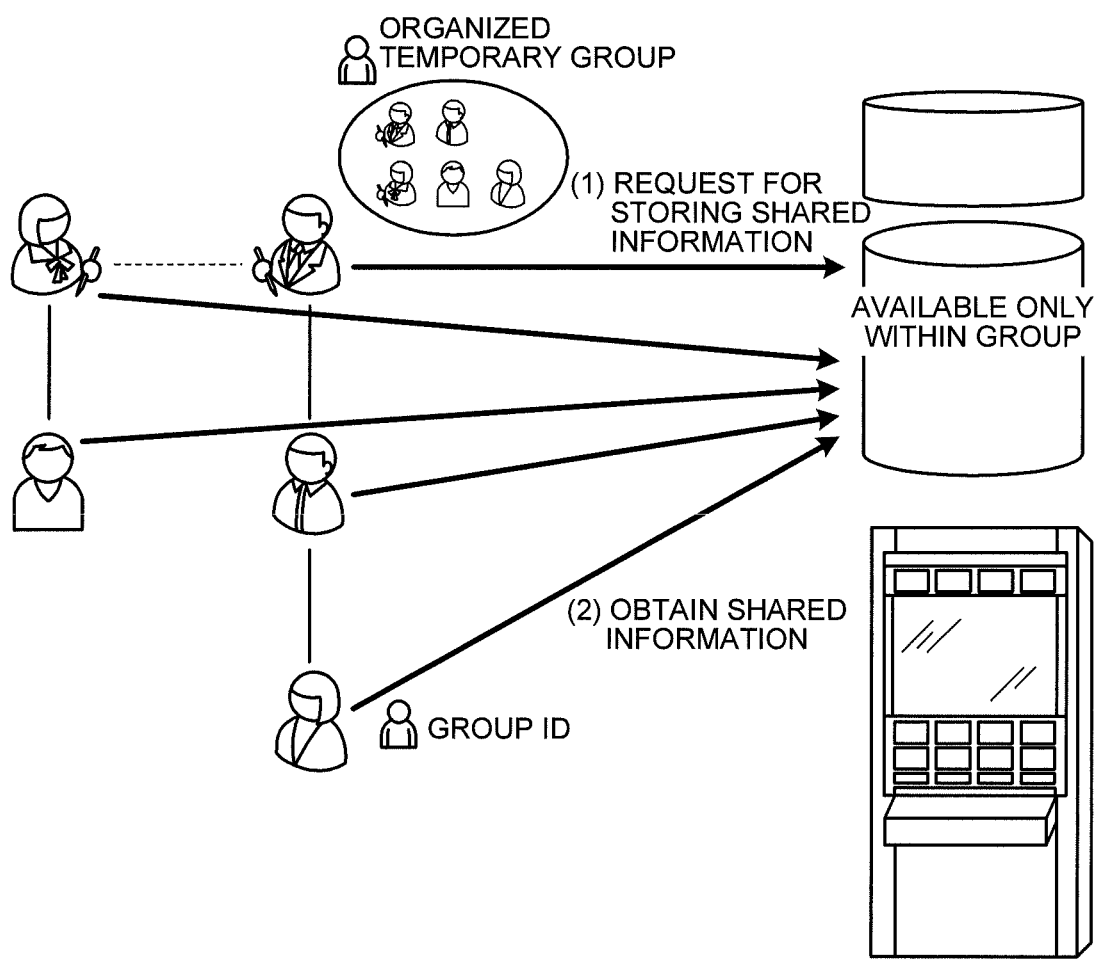
FIG. 23 is a schematic illustrating a process of storing shared information in an external terminal, and obtaining the shared information from the external terminal.
Figure 24:
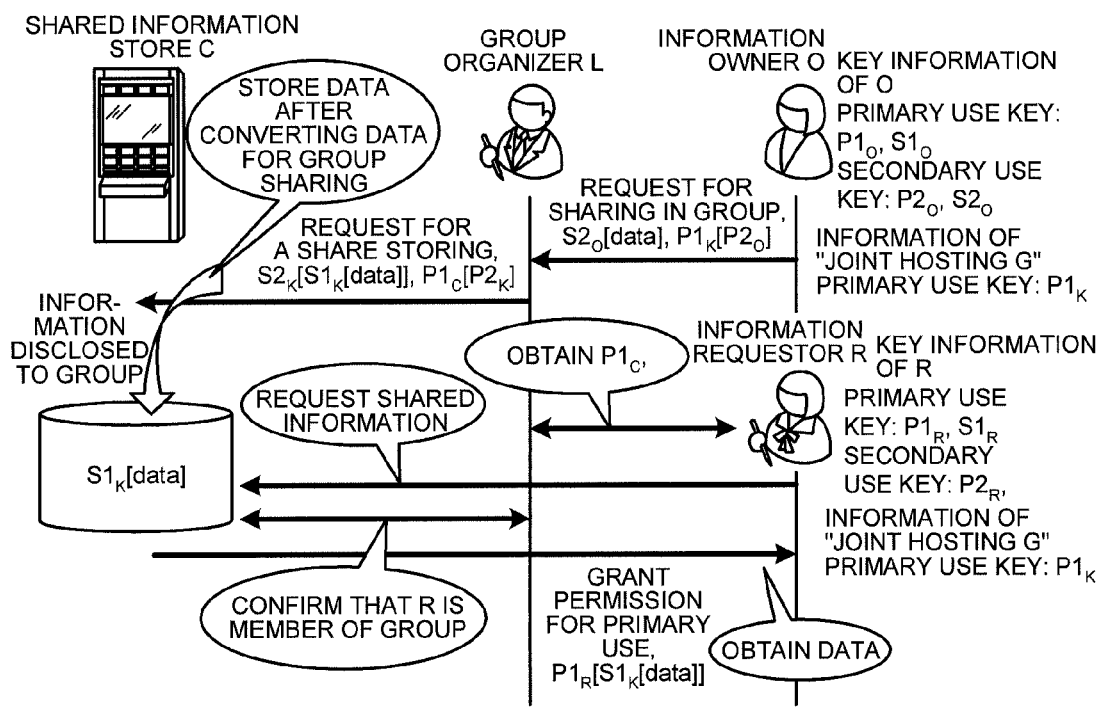
FIG. 24 is a schematic illustrating the process of storing shared information in an external terminal, and obtaining the shared information from the external terminal.
Figure 25:
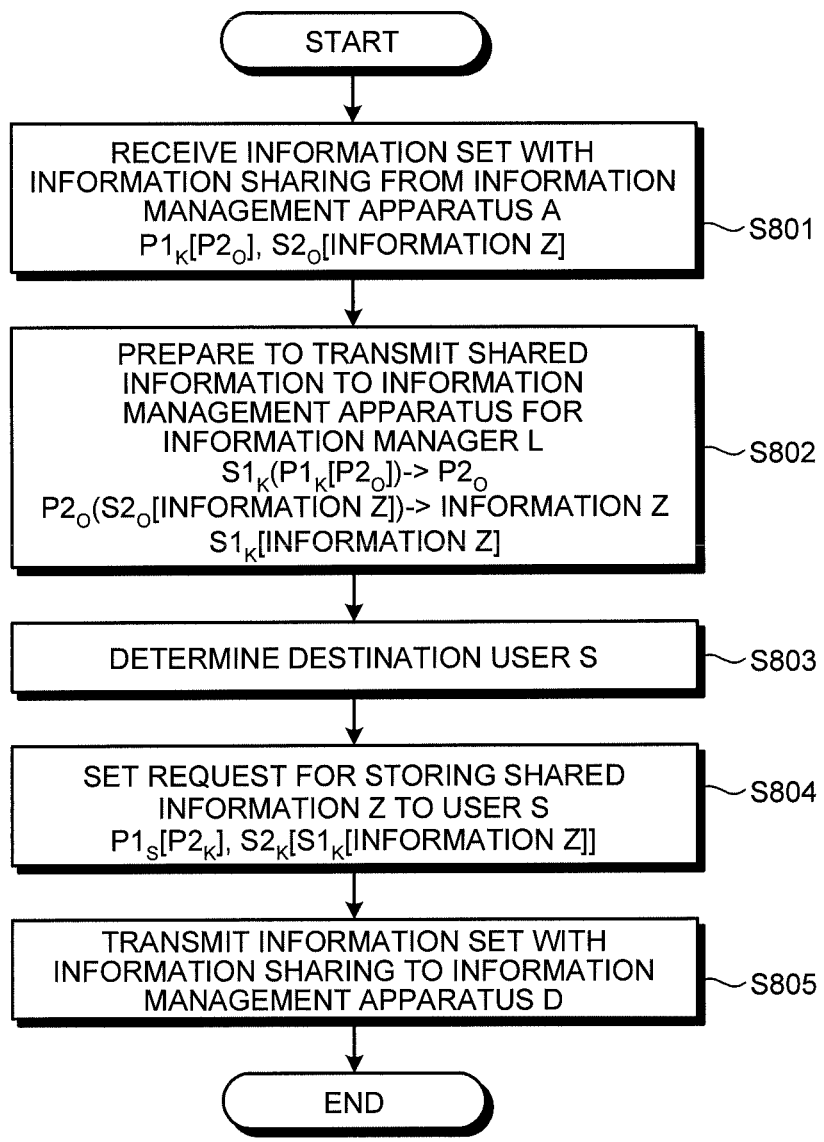
FIG. 25 is a flowchart illustrating a process performed by the information management apparatus according to a third embodiment of the present invention.
Figure 26:
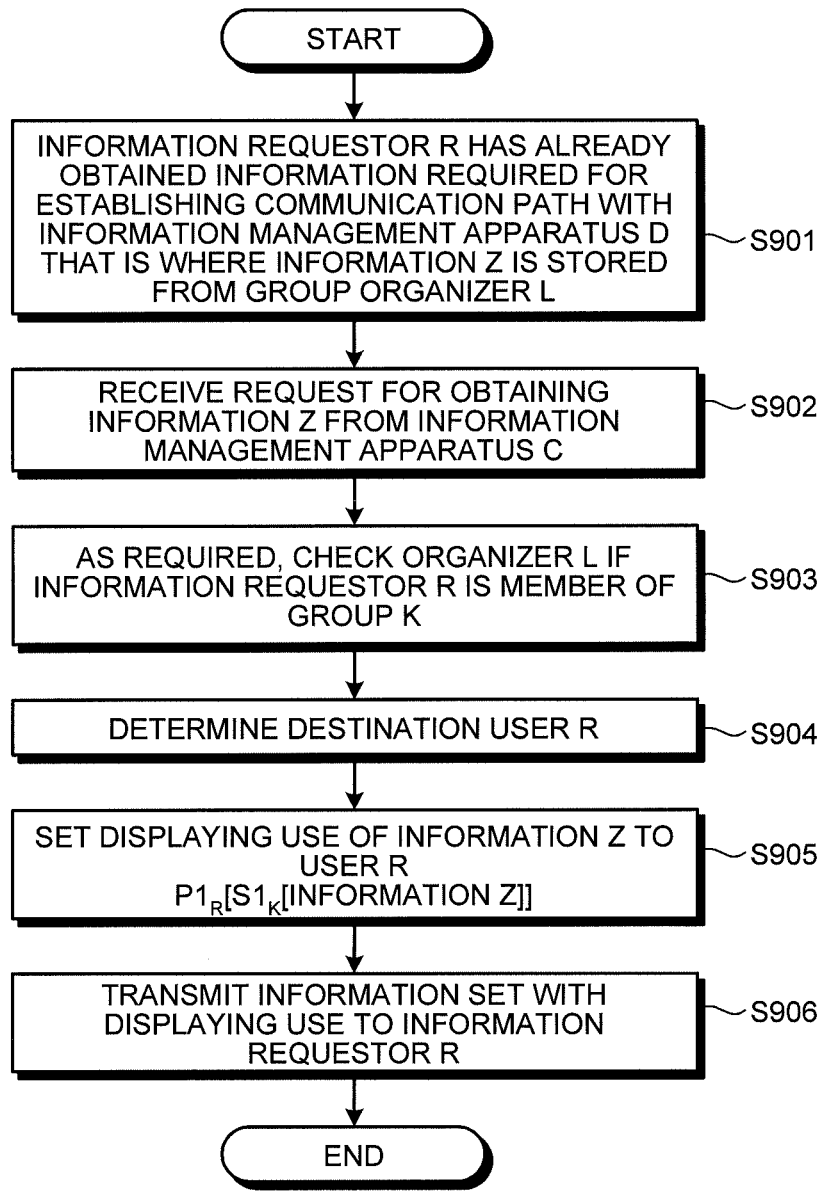
FIG. 26 is a flowchart illustrating a process performed by the information management apparatus according to the third embodiment.
Figure 27:
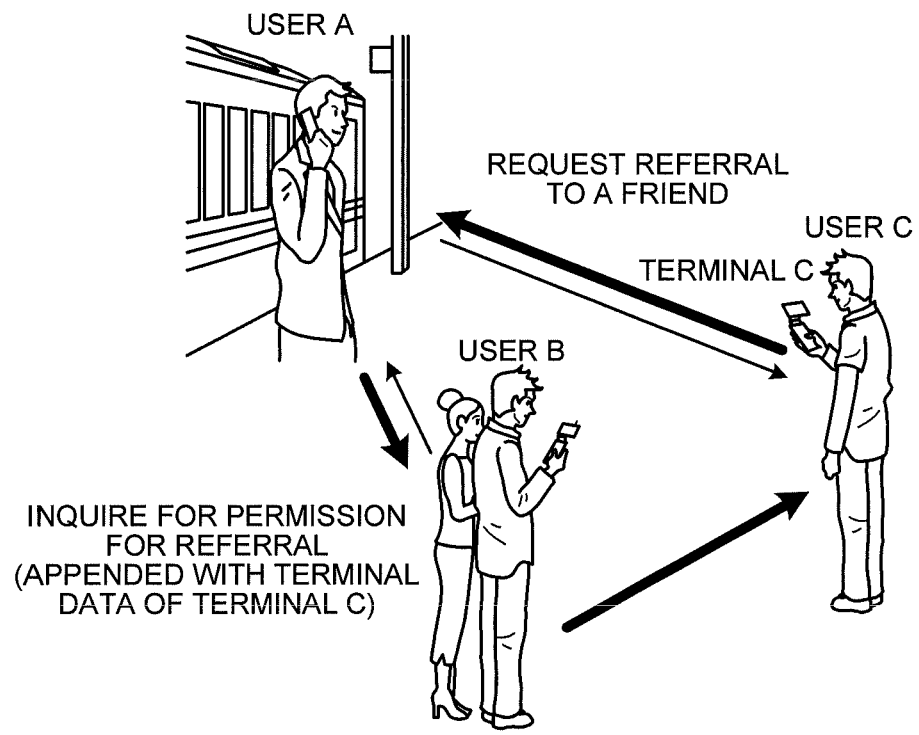
FIG. 27 is a schematic for explaining a conventional technology.
Figure 28:
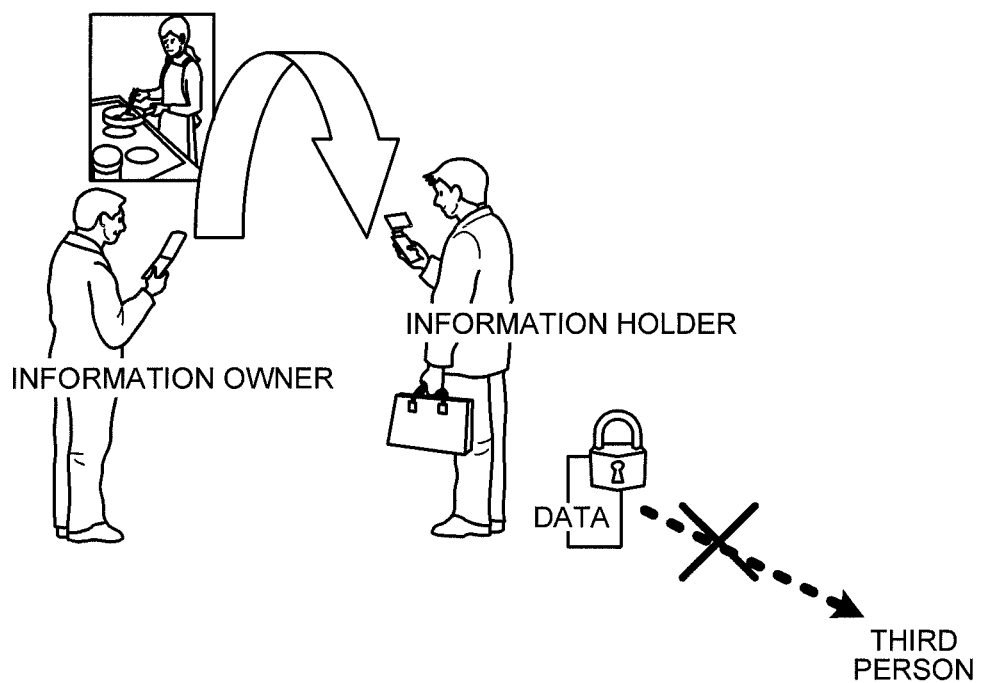
FIG. 28 is a schematic for explaining a conventional technology.

Therefore, in a third embodiment of the present invention described below, as to shared information that is information shared in a group, the primary use key, which permits use of the shared information within the terminal that obtains the information, or the secondary use key, which permits the terminal that obtains the shared information to forward the information, is specified, and shared information set with the primary use key or shared information set with the secondary use key is stored in an external terminal. A process performed by an information management apparatus 10a according to the third embodiment in such a situation will be explained with reference to FIGS. 23 to 26. FIG. 23 is a schematic illustrating a process of storing shared information in an external terminal, and obtaining the shared information from the external terminal. FIG. 24 is a schematic illustrating the process of storing shared information in an external terminal, and obtaining the shared information from the external terminal. FIGS. 25 and 26 are flowcharts illustrating processes performed by the information management apparatus according to the third embodiment.

As illustrated in FIG. 23, the information management apparatus 10a transmits a request for storing shared information to an external terminal, and stores the shared information in the external terminal. The shared information stored in the external terminal is information made available only to members of a group. Each of the members of the group obtains the shared information from the external terminal using a group ID.

Storing at which the shared information is stored in the external terminal and obtaining the shared information will now be explained with reference to FIG. 24. As illustrated in FIG. 24, the information management apparatus of the information owner O transmits a group sharing request that is a request for making data available for sharing in the group as well as $S2_O[data]$, $P1_K[P2_O]$ to the information management apparatus of a group organizer L. The information management apparatus of the group organizer L transmits a share storing request as well as $S2_K[S1_K[data]]$, $P1_C[P2_K]$ to the external terminal of a shared information store C. The external terminal uses the group key information to convert the received data into shared data for the group, and stores therein the data so that any user belonging to the group and having permission for primary use and having a primary use key can access the data.

When a request for the shared information is issued from the information management apparatus of the information requestor R to the external terminal, the external terminal checks if the information requestor R is a member of the group. After confirming that the information requestor R is a member of the group, the external terminal transmits the shared information to the information management apparatus of the information requestor R.

A process performed by the information management apparatus according to the third embodiment will now be explained with reference to FIGS. 25 and 26. FIG. 25 explains a process in which the organizer transmits the information to another apparatus to make the information available for sharing on the other apparatus. FIG. 26 explains a process in which a member of the group obtains the information made available on the other apparatus for sharing by the organizer of the group.

As illustrated in FIG. 25, when the information management apparatus B receives information set with information sharing from the information management apparatus A (Step S801), the information manager L prepares to transmit the shared information to the information management apparatus (Step S802). In other words, the information management apparatus B performs the decryption process using $S1_K$ to obtain $P2_O$, and obtains the information Z using $P2_O$. By locking the information Z with a group public primary use key, the information can be made available for access to the members of the group.

When a destination user S is determined (Step S803), the information management apparatus B sets a request for storing the shared information Z to the user S (Step S804), and transmits the information set with information sharing to an information management apparatus D (Step S805).

As illustrated in FIG. 26, the information management apparatus C then obtains information used to establish a communication path to the information management apparatus D that is where the information Z is stored from the information management apparatus B of the group organizer L (Step S901). The information management apparatus B then receives a request for obtaining the information Z from the information management apparatus C (Step S902), and checks if the information requestor R is a member of the group K (Step S903).

When the destination user R is determined (Step S904), the information management apparatus B sets a displaying use of the shared information Z to the user R (Step S905), and transmits information set with the displaying use to the information requestor R (Step S906).

In this manner, in the third embodiment, a primary use key, which permits use of the shared information within the terminal that obtained the information, or a secondary use key, which permits the terminal that obtained the information to forward the information, is set to shared information that is information shared in a group. The shared information set with the primary use key or the secondary use key is then stored in the external terminal. Therefore, the external terminal can manage the shared information, without causing each of the users to manage the shared information. Thus, the shared information can be managed easily and securely.

Fourth Embodiment

The first to the third embodiments are explained above. However, an embodiment of the present invention may be implemented in various different ways other than those described above. Therefore, other embodiments within the scope of embodiments of the present invention will now be explained as a fourth embodiment of the present invention.

(1) System Configuration, etc.

Each of the elements of the apparatuses illustrated herein is merely a depiction of concepts or functionality, and does not necessarily configured physically in the manner illustrated in the drawings. In other words, specific configurations in which each of the apparatuses is distributed or integrated are not limited to those illustrated in the drawings, and a whole or a part of the apparatuses may be distributed or integrated functionally or physically in any units depending on various loads or utilization. For example, the first control information setting unit 2 and the second information setting unit 3 may be integrated.

(2) Computer Program

The information management method explained in the embodiments can be realized by causing a computer, such as a personal computer or a workstation, to execute a computer program prepared in advance. The computer program may be distributed over a network such as the Internet. Furthermore, the computer program may also be provided in a manner recorded in a computer-readable recording medium, such as a hard disk, a flexible disk (FD) a compact disk read-only memory (CD-ROM), a magneto-optical disk (MO), and a digital versatile disk (DVD), and be executed by causing a computer to read the program from the recording medium.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An information management apparatus comprising:
a processor; and
a memory, wherein the processor executes:
first setting first control information for permitting use of information within a destination terminal, to the information;
second setting second control information for permitting the destination terminal to forward the information, to the information;
first controlling, when information set with the first control information is received from a source terminal, for the information management apparatus to permit that the destination terminal uses the information locally within the destination terminal;
second controlling, when information set with the second control information is received from a source terminal, for the information management apparatus to permit that the destination terminal forwards the information to a terminal other than the destination terminal;
requesting a signature from an intermediating terminal to the destination terminal, the intermediating terminal intermediating a transmission and a reception of information between the source terminal and the destination terminal;
first transmitting the signature from the destination terminal that is requested of the signature at the requesting to the intermediating terminal;
forwarding the signature transmitted at the first transmitting to the source terminal; and
second transmitting information which is set with the first control information and is locked using the signature forwarded at the forwarding, to the destination terminal, wherein
the requesting includes storing a contact identification (CID) of an information owner that has been disclosed to an information holder as information that is permitted for the primary use in the memory and notifying a request for joining a group to the information management apparatus of the information owner using the CID, wherein
the processor further executes:
third setting, as to shared information that is information shared in a group, first share control information for permitting use within a terminal obtaining the shared information, or second share control information for permitting a terminal obtaining the shared information to forward the shared information; and
storing shared information set with the first share control information or the second share control information at the third setting in an external terminal, wherein
the external terminal is an external terminal that uses group key information to convert the received data into shared data for the group and that stores therein the data so that any user belonging to the group and having permission for primary use and having a primary use key can access the data.

2. The information management apparatus according to claim 1, wherein, the second controlling includes converting, when forwarding information set with the second control information to another terminal, the information set with the second control information into information set with the first control information, and forwarding the information thus converted to the another terminal.

3. The information management apparatus according to claim 1, further comprising:
transmitting a request for joining a group; and
receiving a response issued in response to the request for joining the group transmitted at the transmitting.

4. An information management method comprising:
first setting first control information for permitting use of information within a destination terminal, to the information;
second setting second control information for permitting the destination terminal to forward the information, to the information;
first controlling, when information set with the first control information is received from a source terminal, for an information management apparatus to permit that the destination terminal uses the information locally within the destination terminal;
second controlling, when information set with the second control information is received from a source terminal, for the information management apparatus to permit that the destination terminal forwards the information to a terminal other than the destination terminal;
requesting a signature from an intermediating terminal to the destination terminal, the intermediating terminal intermediating a transmission and a reception of information between the source terminal and the destination terminal;
first transmitting the signature from the destination terminal that is requested of the signature at the requesting to the intermediating terminal;
forwarding the signature transmitted at the first transmitting to the source terminal; and
second transmitting information which is set with the first control information and is locked using the signature forwarded at the forwarding, to the destination terminal, wherein
the requesting includes storing a contact identification (CID) of an information owner that has been disclosed to an information holder as information that is permitted for the primary use in a memory and notifying a request for joining a group to the information management apparatus of the information owner using the CID, wherein
the information management method further includes:
third setting, as to shared information that is information shared in a group, first share control information for permitting use within a terminal obtaining the shared information, or second share control information for permitting a terminal obtaining the shared information to forward the shared information; and
storing shared information set with the first share control information or the second share control information at the third setting in an external terminal, wherein
the external terminal is an external terminal that uses group key information to convert the received data into shared data for the group and that stores therein the data so that any user belonging to the group and having permission for primary use and having a primary use key can access the data.

5. A non-transitory computer-readable storage medium storing an information management program, the information management program causing a computer to execute:

first setting first control information for permitting use of information within a destination terminal, to the information;

second setting second control information for permitting the destination terminal to forward the information, to the information;

first controlling, when information set with the first control information is received from a source terminal, for an information management apparatus to permit that the destination terminal uses the information locally within the destination terminal;

second controlling, when information set with the second control information is received from a source terminal, for the information management apparatus to permit that the destination terminal forwards the information to a terminal other than the destination terminal;

requesting a signature from an intermediating terminal to the destination terminal, the intermediating terminal intermediating a transmission and a reception of information between the source terminal and the destination terminal;

first transmitting the signature from the destination terminal that is requested of the signature at the requesting to the intermediating terminal;

forwarding the signature transmitted at the first transmitting to the source terminal; and second transmitting information which is set with the first control information and is locked using the signature forwarded at the forwarding, to the destination terminal, wherein the requesting includes storing a contact identification (CID) of an information owner that has been disclosed to an information holder as information that is permitted for the primary use in a memory and notifying a request for joining a group to the information management apparatus of the information owner using the CID, wherein the information management program causes a computer to execute:

third setting, as to shared information that is information shared in a group, first share control information for permitting use within a terminal obtaining the shared information, or second share control information for permitting a terminal obtaining the shared information to forward the shared information; and storing shared information set with the first share control information or the second share control information at the third setting in an external terminal, wherein the external terminal is an external terminal that uses group key information to convert the received data into shared data for the group and that stores therein the data so that any user belonging to the group and having permission for primary use and having a primary use key can access the data.

6. The non-transitory computer-readable storage medium according to claim 5, wherein the computer program further causing the computer to execute:

third setting, as to shared information that is information shared in a group, first share control information for permitting local use to a terminal that obtains the shared information, or second share control information for permitting a terminal that obtains the shared information to forward the shared information; and storing shared information set with the first share control information or the second share control information at the third setting in an external terminal.

* * * * *